US006940645B2

(12) United States Patent
Liang et al.

(10) Patent No.: US 6,940,645 B2
(45) Date of Patent: *Sep. 6, 2005

(54) MONOCENTRIC AUTOSTEREOSCOPIC OPTICAL APPARATUS WITH A SPHERICAL GRADIENT-INDEX BALL LENS

(75) Inventors: Rongguang Liang, Rochester, NY (US); David Kessler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/420,379

(22) Filed: Apr. 22, 2003

(65) Prior Publication Data

US 2004/0212882 A1 Oct. 28, 2004

(51) Int. Cl.[7] .......................... G02B 27/22; G02B 3/00; G03B 21/00
(52) U.S. Cl. ..................... 359/462; 359/464; 359/664; 359/654; 353/7
(58) Field of Search ................................ 359/462, 464, 359/433, 652, 653, 654, 709, 710, 711, 712, 641, 664, 651, 655, 665, 434, 385; 353/7; 345/8

(56) References Cited

U.S. PATENT DOCUMENTS

| | | | |
|---|---|---|---|
| 3,748,015 A | | 7/1973 | Offner |
| 4,124,798 A | | 11/1978 | Thompson |
| 4,257,672 A | * | 3/1981 | Balliet ........................ 385/35 |
| 4,331,390 A | | 5/1982 | Shafer |
| 4,623,223 A | | 11/1986 | Kempf |
| 4,799,763 A | | 1/1989 | Davis et al. |

(Continued)

FOREIGN PATENT DOCUMENTS

| | | |
|---|---|---|
| EP | 1 267 197 A2 | 12/2002 |
| EP | 1 343 333 A2 | 9/2003 |
| JP | 63-23118 | 1/1988 |

OTHER PUBLICATIONS

G. J. Kintz; "Autostereoscopic Properties of Spherical Panoramic Virtual Displays" SID 99 Digest, pp. 1000–1003.
S.A. Benton, T.E. Slowe, A.B. Kropp, and S.L. Smith; "Micropolarizer–based multiple–viewer autostereoscopic display", SPIE Jan. 1999, pp. 1–8.
S. McKay, G. Mair, S. Mason, and K. Revie; "Membrane Mirror Based Autostereoscopic Display for Tele–Operation and Telepresence Applications" Proceedings of SPIE vol. 3957, pp. 198–207.
W. Smith; "Modern Optical Engineering" pp. 42–45.
E. Marchand; "Gradient Index Optics" 1978, pp. 6–21.
R. K. Luneburg; "Mathematical Theory of Optics" 1964, sections 29–30.

*Primary Examiner*—Audrey Chang
(74) *Attorney, Agent, or Firm*—Nelson Adrian Blish

(57) ABSTRACT

A monocentric autostereoscopic optical apparatus (10) for viewing a virtual image, electronically generated and projected on a curved surface. For each left and right image component, a separate optical system comprises an image generation system (70*l*, 70*r*) and projection system (72), the projection system comprising a spherical diffusive surface (40) and a spherical gradient-index ball lens assembly (31) to provide wide field of view. A monocentric arrangement of optical components images the ball lens pupil (48) at the viewing pupil (14) and essentially provides a single center of curvature (C) for projection components. Use of such a monocentric arrangement, diffusive surface (40), and ball lens (30) provides an exceptionally wide field of view with large viewing pupil (14).

105 Claims, 16 Drawing Sheets

U.S. PATENT DOCUMENTS

| | | | |
|---|---|---|---|
| 4,854,688 A | * 8/1989 | Hayford et al. | 359/433 |
| 5,206,499 A | 4/1993 | Mantravadi et al. | |
| 5,255,028 A | 10/1993 | Biles | |
| 5,319,968 A | 6/1994 | Billing-Ross et al. | |
| 5,572,229 A | 11/1996 | Fisher | |
| 5,671,992 A | 9/1997 | Richards | |
| 5,757,544 A | * 5/1998 | Tabata et al. | 359/434 |
| 5,838,416 A | * 11/1998 | Chen et al. | 349/202 |
| 5,908,300 A | 6/1999 | Walker et al. | |
| 5,940,564 A | 8/1999 | Jewell | |
| 6,034,717 A | 3/2000 | Dentinger et al. | |
| 6,292,305 B1 | * 9/2001 | Sakuma et al. | 359/649 |
| 6,416,181 B1 | * 7/2002 | Kessler et al. | 353/7 |
| 6,511,182 B1 | 1/2003 | Agostinelli et al. | |
| 6,522,474 B2 | * 2/2003 | Cobb et al. | 359/633 |
| 6,550,918 B1 | 4/2003 | Agostinelli et al. | |
| 2002/0075452 A1 | 6/2002 | Kessler et al. | |

* cited by examiner

|   | $\lambda = 656.3nm$ | $\lambda = 587.6nm$ | $\lambda = 486.1nm$ |
|---|---|---|---|
| $n_0$ | 1.60008 | 1.60311 | 1.61003 |
| $n_1$ | 0.000281439 | 0.323951037e−4 | −0.000393113 |
| $n_2$ | −0.000333187 | −0.000284220 | −0.00020983 |
| $n_3$ | 0.366585423e−5 | −0.261362511e−6 | −0.697723336e−5 |
| $n_4$ | −0.621680804e−7 | 0.468345577e−7 | 0.230670627e−6 |

MONOCENTRIC AUTOSTEREOSCOPIC OPTICAL APPARATUS WITH A SPHERICAL GRADIENT-INDEX BALL LENS

FIELD OF THE INVENTION

The invention generally relates to autostereoscopic display systems for viewing electronically generated images and more particularly relates to an apparatus and method for a monocentric arrangement of optical components to provide a very wide field of view and large exit pupils.

BACKGROUND OF THE INVENTION

The potential value of autostereoscopic display systems is widely appreciated particularly in entertainment and simulation fields. Autostereoscopic display systems include "immersion" systems, intended to provide a realistic viewing experience for an observer by visually surrounding the observer with a 3-dimensional (3-D) image having a very wide field of view. As differentiated from the larger group of stereoscopic displays that include it, the autostereoscopic display is characterized by the absence of any requirement for a wearable item of any type, such as goggles, headgear, or special glasses. That is, an autostereoscopic display attempts to provide "natural" viewing conditions for an observer.

In an article in SID 99 Digest, "Autostereoscopic Properties of Spherical Panoramic Virtual Displays," G. J. Kintz discloses one approach to providing autostereoscopic display with a wide field of view. Using the Kintz approach, no glasses or headgear are required. However, the observer's head must be positioned within a rapidly rotating spherical shell having arrays of LED emitters, imaged by a monocentric mirror, to form a collimated virtual image. While the Kintz design provides one solution for a truly autostereoscopic system having a wide field of view, this design has considerable drawbacks. Among the disadvantages of the Kintz design is the requirement that the observer's head be in close proximity to a rapidly spinning surface. Such an approach requires measures to minimize the likelihood of accident and injury from contact with components on the spinning surface. Even with protective shielding, proximity to a rapidly moving surface could, at the least, cause the observer some apprehension. In addition, use of such a system imposes considerable constraints on head movement.

Another class of autostereoscopic systems operates by imaging the exit pupils of a pair of projectors onto the eyes of an observer, outlined in an article by S. A. Benton, T. E. Slowe, A. B. Kropp, and S. L. Smith ("Micropolarizer-Based Multiple-Viewer Autostereoscopic Display," in Stereoscopic Displays and Virtual Reality Systems VI, SPIE, January, 1999). Pupil imaging, as outlined by Benton in the above-mentioned article, can be implemented using large lenses or mirrors. An observer whose eyes are coincident with the imaged pupils views a stereoscopic scene without crosstalk, without wearing eyewear of any kind.

It can be readily appreciated that the value and realistic quality of the viewing experience provided by an autostereoscopic display system using pupil imaging is enhanced by presenting the 3-D image with a wide field of view and large exit pupil. Such a system is most effective for immersive viewing functions if it allows an observer to be comfortably seated, without constraining head movement to within a tight tolerance and without requiring the observer to wear goggles or other device. For fully satisfactory 3-D viewing, such a system should provide separate, high-resolution images to right and left eyes. It can also be readily appreciated that such a system is most favorably designed for compactness, to create an illusion of depth and width of field, while occupying as little actual floor space and volume as is possible. For the most realistic viewing experience, the observer should be presented with a virtual image, disposed to appear a large distance away.

It is also known that conflict between depth cues associated with "vergence" and "accommodation" can adversely impact the viewing experience. Vergence refers to the degree at which the observer's eyes must be crossed in order to fuse the separate images of an object within the field of view. Vergence decreases, then vanishes as viewed objects become more distant. Accommodation refers to the requirement that the eye lens of the observer change shape to maintain retinal focus for the object of interest. It is known that there can be a temporary degradation of the observer's depth perception when the observer is exposed for a period of time to mismatched depth cues for vergence and accommodation. It is also known that this negative effect on depth perception can be mitigated when the accommodation cues correspond to distant image position.

An example of a conventional autostereoscopic display unit is disclosed in U.S. Pat. No. 5,671,992 (Richards), at which a seated observer experiences apparent 3-D visual effects created using images generated from separate projectors, one for each eye, and directed to the observer using an imaging system comprising a number of mirrors.

Conventional solutions for stereoscopic imaging have addressed some of the challenges noted above, but there is room for improvement. For example, some early stereoscopic systems employed special headwear, goggles, or eyeglasses to provide the 3-D viewing experience. As just one example of such a system, U.S. Pat. No. 6,034,717 (Dentinger et al.) discloses a projection display system requiring an observer to wear a set of passive polarizing glasses in order to selectively direct the appropriate image to each eye for creating a 3-D effect.

Certainly, there are some situations for which headgear of some kind can be considered appropriate for stereoscopic viewing, such as with simulation applications. For such an application, U.S. Pat. No. 5,572,229 (Fisher) discloses a projection display headgear that provides stereoscopic viewing with a wide field of view. However, where possible, there are advantages to providing autostereoscopic viewing, in which an observer is not required to wear any type of device, as was disclosed in the device of U.S. Pat. No. 5,671,992. It would also be advantageous to allow some degree of freedom for head movement. In contrast, U.S. Pat. No. 5,908,300 (Walker et al.) discloses a hang-gliding simulation system in which an observer's head is maintained in a fixed position. While such a solution may be tolerable in the limited simulation environment disclosed in the Walker et al. patent, and may simplify the overall optical design of an apparatus, constraint of head movement would be a disadvantage in an immersion system. Notably, the system disclosed in U.S. Pat. No. 5,908,300 employs a narrow viewing aperture, effectively limiting the field of view. Complex, conventional projection lenses, disposed in an off-axis orientation, are employed in the device disclosed in U.S. Pat. No. 5,908,300, with scaling used to obtain the desired output pupil size.

A number of systems have been developed to provide stereoscopic effects by presenting to the observer the combined image, through a beamsplitter, of two screens at two different distances from the observer, thereby creating the illusion of stereoscopic imaging, as is disclosed in U.S. Pat. No. 5,255,028 (Biles). However, this type of system is limited to small viewing angles and is, therefore, not suitable for providing an immersive viewing experience. In addition, images displayed using such a system are real images, presented at close proximity to the observer, and thus likely to introduce the vergence/accommodation problems noted above.

It is generally recognized that, in order to minimize vergence/accommodation effects, a 3-D viewing system should display its pair of stereoscopic images, whether real or virtual, at a relatively large distance from the observer. For real images, this means that a large display screen must be employed, preferably placed a good distance from the observer. For virtual images, however, a relatively small curved mirror can be used as is disclosed in U.S. Pat. No. 5,908,300. The curved mirror acts as a collimator, providing a virtual image at a large distance from the observer. Another system for stereoscopic imaging is disclosed in "Membrane Mirror Based Autostereoscopic Display for Tele-Operation and Telepresence Applications," in Stereoscopic Displays and Virtual Reality Systems VII, Proceedings of SPIE, Volume 3957 (McKay, Mair, Mason, Revie) which uses a stretchable membrane mirror. The apparatus disclosed in the McKay article has limited field of view, due to the use of conventional projection optics and due to dimensional constraints that limit membrane mirror curvature.

Curved mirrors have also been used to provide real images in stereoscopic systems, where the curved mirrors are not used as collimators. Such systems are disclosed in U.S. Pat. No. 4,623,223 (Kemptf); and U.S. Pat. No. 4,799,763 (Davis et al.) for example. However, systems such as these are generally suitable where only a small field of view is needed.

Notably, existing solutions for stereoscopic projection, project images onto a flat screen, even where that image is then reflected from a curved surface. This can result in undesirable distortion and other image aberration, constraining field of view and limiting image quality overall.

From an optical perspective, it can be seen that there would be advantages to autostereoscopic design using pupil imaging. A system designed for pupil imaging must provide separate images to the left and right pupils correspondingly and provide the most natural viewing conditions, eliminating any need for goggles or special headgear. In addition, it would be advantageous for such a system to provide the largest possible pupils to the observer, so as to allow some freedom of movement, and to provide an ultra-wide field of view. It is recognized in the optical arts that each of these requirements, by itself, can be difficult to achieve. An ideal autostereoscopic imaging system must meet the challenge for both requirements to provide a more fully satisfactory and realistic viewing experience. In addition, such a system must provide sufficient resolution for realistic imaging, with high brightness and contrast. Moreover, the physical constraints presented by the need for a system to have small footprint, and dimensional constraints for interocular separation must be considered, so that separate images directed to each eye can be advantageously spaced and correctly separated for viewing. It is instructive to note that interocular distance constraints limit the ability to achieve larger pupil diameter at a given ultrawide field by simply scaling the projection lens.

Monocentric imaging systems have been shown to provide significant advantages for high-resolution imaging of flat objects, such as is disclosed in U.S. Pat. No. 3,748,015 (Offner), which teaches an arrangement of spherical mirrors arranged with coincident centers of curvature in an imaging system designed for unit magnification. The monocentric arrangement disclosed in U.S. Pat. No. 3,748,015 minimizes a number of types of image aberration and is conceptually straightforward, allowing a simplified optical design for high-resolution catoptric imaging systems. A monocentric arrangement of mirrors and lenses is also known to provide advantages for telescopic systems having wide field of view, as is disclosed in U.S. Pat. No. 4,331,390 (Shafer). However, while the advantages of monocentric design for overall simplicity and for minimizing distortion and optical aberrations can be appreciated, such a design concept can be difficult to implement in an immersion system requiring wide field of view and large exit pupil with a reasonably small overall footprint. Moreover, a fully monocentric design would not meet the requirement for full stereoscopic imaging, requiring separate images for left and right pupils.

As is disclosed in U.S. Pat. No. 5,908,300, conventional wide-field projection lenses can be employed as projection lenses in a pupil-imaging autostereoscopic display. However, there are a number of disadvantages with conventional approaches. Wide-angle lens systems, capable of angular fields such as would be needed for effective immersion viewing, would be very complex and costly. Typical wide angle lenses for large-format cameras, such as the Biogon® lens manufactured by Carl-Zeiss-Stiftung in Jena, Germany for example, are capable of 75-degree angular fields. The Biogon® lens consists of seven component lenses and is more than 80 mm in diameter, while only providing a pupil size of 10 mm. For larger pupil size, the lens needs to be scaled in size; however, the large diameter of such a lens body presents a significant design difficulty for an autostereoscopic immersion system, relative to the interocular distance at the viewing position. Costly cutting of lenses so that right- and left-eye assemblies could be disposed side-by-side, thereby achieving a pair of lens pupils spaced consistently with human interocular separation, presents difficult manufacturing problems. Interocular distance limitations constrain the spatial positioning of projection apparatus for each eye and preclude scaling of pupil size by simple scaling of the lens. Moreover, an effective immersion system most advantageously allows a very wide field of view, preferably well in excess of 90 degrees, and would provide large exit pupil diameters, preferably larger than 20 mm.

As an alternative for large field of view applications, ball lenses have been employed for specialized optical functions, particularly miniaturized ball lenses for use in fiber optics coupling and transmission applications, such as is disclosed in U.S. Pat. No. 5,940,564 (Jewell) which discloses advantageous use of a miniature ball lens within a coupling device. On a larger scale, ball lenses can be utilized within an astronomical tracking device, as is disclosed in U.S. Pat. No. 5,206,499 (Mantravadi et al.) In the Mantravadi et al. patent, the ball lens is employed because it allows a wide field of view, greater than 60 degrees, with minimal off-axis aberrations or distortions. In particular, the absence of a unique optical axis is used advantageously, so that every principal ray that passes through the ball lens can be considered to define its own optical axis. Because of its low illumination falloff relative to angular changes of incident light, a single ball lens is favorably used to direct light from space to a plurality of sensors in this application. Notably, photosensors at the output of the ball lens are disposed along a curved focal plane.

The benefits of a spherical or ball lens for wide angle imaging are also utilized in an apparatus for determining space-craft attitude, as is disclosed in U.S. Pat. No. 5,319,968 (Billing-Ross et al.) Here, an array of mirrors direct light rays through a ball lens. The shape of this lens is advantageous since beams which pass through the lens are at normal incidence to the image surface. The light rays are thus refracted toward the center of the lens, resulting in an imaging system having a wide field of view.

Another specialized use of ball lens characteristics is disclosed in U.S. Pat. No. 4,854,688 (Hayford et al.) In the optical arrangement of the Hayford et al. patent, directed to the transmission of a 2-dimensional (2-D) image along a non-linear path, such as attached to headgear for a pilot, a ball lens directs a collimated input image, optically at infinity, for a pilot's view. Another use for wide-angle viewing capabilities of a ball lens is disclosed in U.S. Pat. No. 4,124,798 (Thompson), which teaches use of a ball lens as part of an objective lens in binocular optics for night viewing.

With each of the patents described above that disclose use of a ball lens, there are suggestions of the overall capability of the ball lens to provide, in conjunction with support optics, wide field of view imaging. However, there are substantial problems that must be overcome in order to make effective use of such devices for immersive imaging applications, particularly where an image is electronically processed to be projected. Conventional electronic image presentation techniques, using devices such as spatial light modulators, provide an image on a flat surface. Ball lens performance with flat field imaging would be extremely poor.

There are also other basic optical limitations for immersion systems that must be addressed with any type of optical projection that provides a wide field of view. An important limitation is imposed by the LaGrange invariant. Any imaging system conforms to the LaGrange invariant, whereby the product of pupil size and semi-field angle is equal to the product of the image size and the numerical aperture and is an invariant for the optical system. This can be a limitation when using, as an image generator, a relatively small spatial light modulator or similar pixel array which can operate over a relatively small numerical aperture since the LaGrange value associated with the device is small. A monocentric imaging system, however, providing a large field of view with a large pupil size (that is, a large numerical aperture), inherently has a large LaGrange value. Thus, when this monocentric imaging system is used with a spatial light modulator having a small LaGrange value, either the field or the aperture of the imaging system, or both, will be underfilled due to such a mismatch of LaGrange values. For a detailed description of the LaGrange invariant, reference is made to Modem Optical Engineering, The Design of Optical Systems by Warren J. Smith, published by McGraw-Hill, Inc., pages 42–45.

One approach to autostereoscopic imaging is disclosed in U.S. Pat. No. 6,416,181 (Kessler et al.) The Kessler et al. device provides a solution using a ball lens, which minimizes aberrations in image distortions, however, there is room for improvement. For example, a conventional ball lens has limitations on the size of an exit pupil and may contain uncorrected spherical aberrations.

Thus, it can be seen that, while there are some conventional approaches that meet some of the requirements for stereoscopic imaging, there is a need for an improved autostereoscopic imaging solution for viewing electronically generated images, where the solution provides a structurally simple apparatus, minimizes aberrations and image distortion, and meets demanding requirements for wide field of view, large pupil size, and human interocular distance limitations.

SUMMARY OF THE INVENTION

It is an object of the present invention to provide an autostereoscopic optical apparatus for viewing a stereoscopic virtual image.

According to one aspect of the present invention a monocentric autostereoscopic optical apparatus comprises a left image to be viewed by an observer at a left viewing pupil and a right image to be viewed by the observer at a right viewing pupil, the apparatus comprising:

(a) a left optical system for forming the left image to be viewed at the left viewing pupil, the system comprising:
  (1) a left image generation system for providing scene content, comprising a left image generator and a left relay lens for forming a left intermediate image;
  (2) a left projection system comprising a left spherically curved diffusive surface for accepting the left intermediate image, the left spherically curved surface having its center of curvature substantially concentric with a left spherical gradient-index ball lens, the left spherical gradient-index ball lens spaced apart from the left spherically curved diffusive surface such that a left curved image is formed, the left curved image being a real image, the center of curvature of the left curved image coincident with the center of curvature of the left spherical gradient-index ball lens, the left spherical gradient-index ball lens having a left spherical gradient-index ball lens pupil;

(b) a right optical system for forming the right image to be viewed at the right viewing pupil, the system comprising:
  (1) a right image generation system for providing scene content, comprising a right image generator and a right relay lens for forming a right intermediate image;
  (2) a right projection system comprising a right spherically curved diffusive surface for accepting the right intermediate image, the right spherically curved surface having its center of curvature substantially concentric with a right spherical gradient-index ball lens, the right spherical gradient-index ball lens spaced apart from the right spherically curved diffusive surface such that a right curved image is formed, the right curved image being a real image, the center of curvature of the right curved image coincident with the center of curvature of the right spherical gradient-index ball lens, the right spherical gradient-index ball lens having a right spherical gradient-index ball lens pupil;

(c) a curved mirror, the curved mirror having its center of curvature placed substantially optically midway between the left spherical gradient-index ball lens and the right spherical gradient-index ball lens; and (d) a beamsplitter disposed to reflect the left and right curved images toward the curved mirror, the curved mirror disposed to form a virtual stereoscopic image of the left and right curved images, and the curved mirror disposed to form, through the beamsplitter, a real image of the left spherical gradient-index ball lens pupil at the left viewing pupil and a real image of the right spherical gradient-index ball lens pupil at the right viewing pupil.

A feature of the present invention is the use of a monocentric arrangement of optical components, which simplifies design, minimizes aberrations, and provides a wide field of view with large exit pupils.

A further feature of the present invention is the use of an intermediate diffusive surface within the optical system in order to match the low LaGrange invariant of a small image generator to the large LaGrange invariant of a projection system.

An alternative feature of the present invention is the projection of light from an emissive curved surface. This arrangement helps to minimize the complexity of an autostereoscopic optical apparatus and the number of support optical components necessary.

It is an advantage of the present invention that it provides a compact arrangement of optical components, capable of being packaged in a display system having a small footprint.

It is a further advantage of the present invention that it allows high-resolution stereoscopic electronic imaging with high brightness and high contrast, with a very wide field of view. The present invention provides a system that is light-efficient and requires relatively low levels of light for projection.

It is an advantage of the present invention that it provides a solution for wide field stereoscopic projection that is inexpensive when compared with the cost of conventional projection lens systems.

It is a further advantage of the present invention that it provides stereoscopic viewing without requiring an observer to wear goggles or other device.

It is yet a further advantage of the present invention that it provides an exit pupil of sufficient size for non-critical alignment of an observer in relation to the display.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood with the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
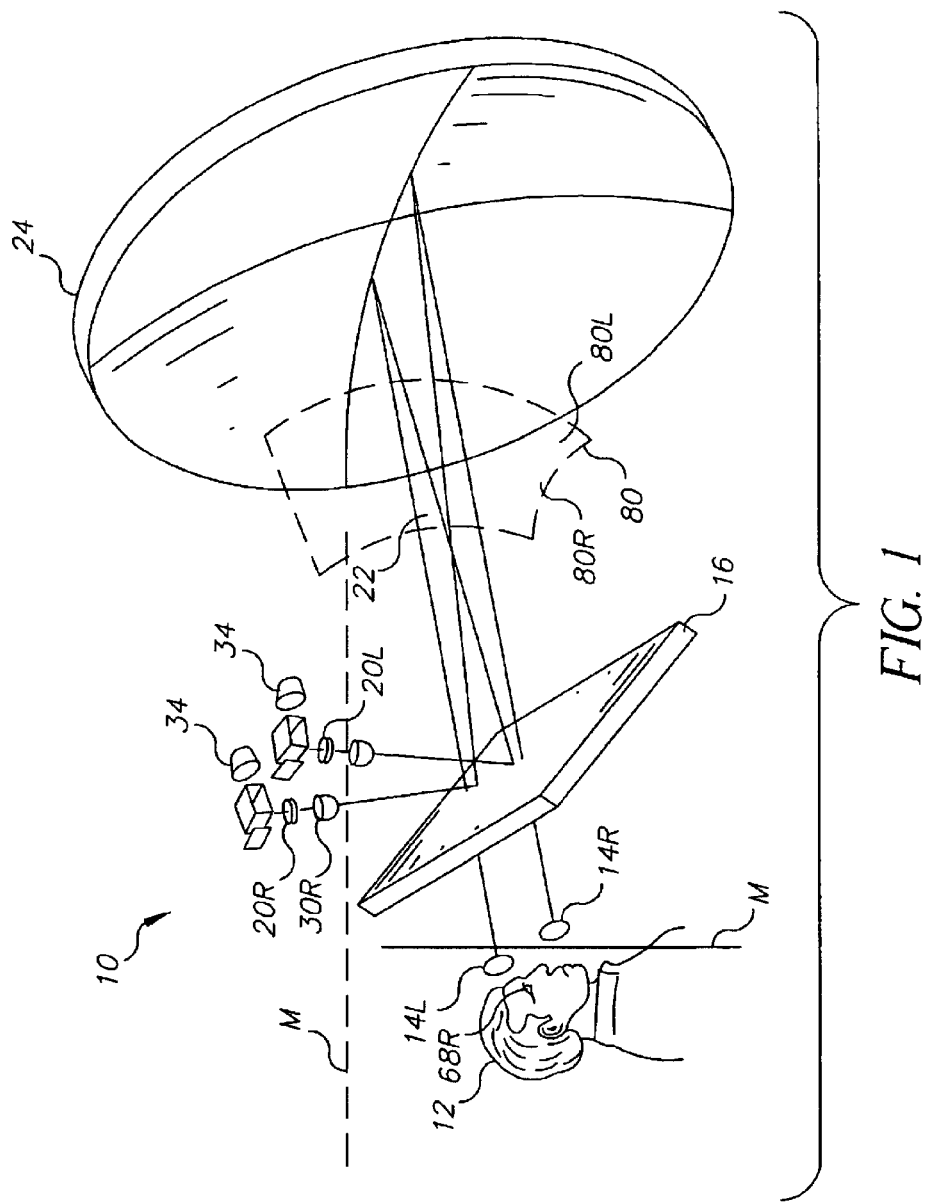
FIG. 1 is a perspective view showing the use of apparatus of the present invention in an autostereoscopic imaging system.

Referring to FIG. 1, there is shown a perspective view of an autostereoscopic imaging system 10. An observer 12 is typically seated in position to view a virtual stereoscopic image from left and right viewing pupils 14$l$ and 14$r$. Optimal viewing conditions are obtained when left and right eye pupils 68$l$ (not labeled in FIG. 1) and 68$r$ of observer 12 are coincident with the position of left and right viewing pupils 14$l$ and 14$r$.

A right optical system 20$r$ directs an image through a right ball lens assembly 30$r$ to a beamsplitter 16. A right curved image 80$r$ is formed at a front focal surface 22 of a curved mirror 24, so as to be located between right ball lens 30$r$ and curved mirror 24.

It must be noted that, as shown in FIG. 1, there are two components to the stereoscopic image seen by observer 12. The stereoscopic image is a curved image 80, which comprises left curved image 80$l$ and a right curved image 80$r$. Left curved image 80$l$ and right curved image 80$r$ differ sufficiently in scene content so as to produce a stereoscopic 3-D effect. The stereoscopic image seen by observer 12 comprises a left image that is viewed at left viewing pupil 14$l$ and a right image that is viewed at right viewing pupil 14$r$. As is represented in FIG. 1, the left and right optical paths cross in autostereoscopic imaging system 10, due to imaging by curved mirror 24.

The description that follows primarily focuses on the optical components that direct light to either one of viewing pupils 14$l$ and 14$r$. It should be noted that, up to and including left and right ball lens assemblies 30$l$ and 30$r$, similar optical components are employed for left optical system 20*l* and right optical system 20*r*, that is, for both left and right optical paths. For clarity, the description that follows applies to both right and left optical system 20 components. Any distinction between right and left optical paths is made only when necessary to be precise. (Appended left "l" or right "r" designators are omitted from this description unless needed.)

Referring again to FIG. 1, the stereoscopic image seen by observer 12 is formed from curved image 80 by mirror 24 as a virtual image. That is, the image does not appear to observer 12 as if projected onto the surface of curved mirror 24; instead, the image appears to be behind curved mirror 24, between the rear of curved mirror 24 and infinity.

FIG. 1 illustrates the key problems to be solved, from an optical design perspective, and shows an overview of the solution provided by the present invention. It is instructive to review key design considerations for achieving the most life-like stereoscopic viewing. In order to provide an effective immersion experience, a wide field of view is important, in excess of the 60 degrees available using prior art techniques. In order to be used comfortably by observer 12, viewing pupils 14*l*, 14*r* must be sufficiently large. As design goals, the autostereoscopic imaging system 10 of the present invention is intended to provide a field of view of at least 90 degrees with the diameter of viewing pupil 14 in excess of 20 mm in diameter.

Figure 2A:
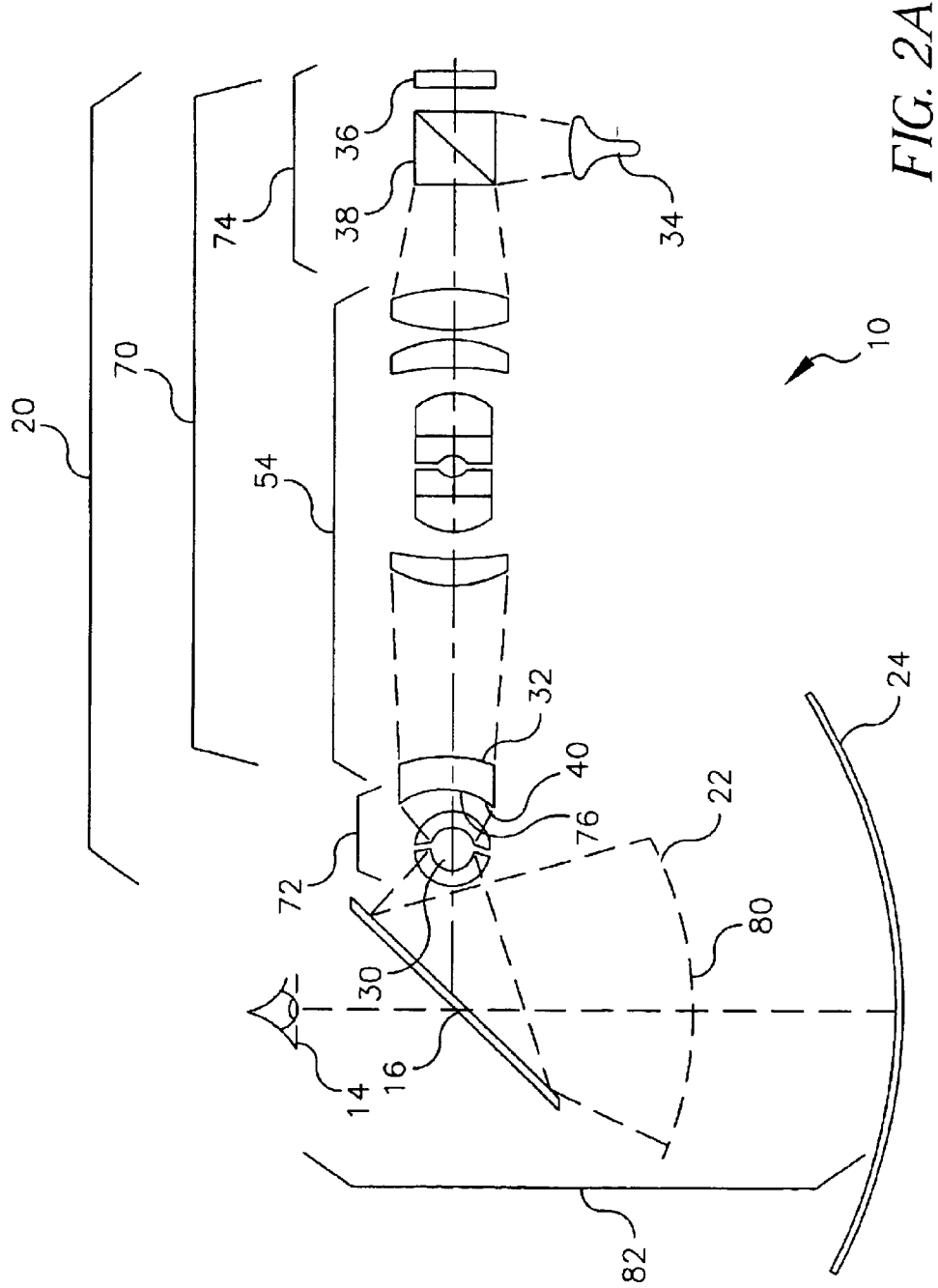
FIGS. 2A and 2B are schematic view identifying key components of an autostereoscopic imaging system of the present invention.

Referring to FIG. 2A, there is shown a schematic view of key optical components in autostereoscopic imaging system 10. For simplicity in FIG. 2A, only one of the left/right optical paths is represented. In actual practice, autostereoscopic imaging system 10 comprises left and right optical systems 20*l* and 20*r*, where, for example, left optical system 20*l* comprises a left image generation system 70*l* and a left projection system 72*l*, with corresponding subcomponents.

Keeping this dual arrangement in mind, optical system 20 comprises image generation system 70. Image generation system 70, in turn, comprises an image generator 74, which provides the scene content for display. In a preferred embodiment, image generator 74 comprises a spatial light modulator 36 controlled by imaging circuitry (not shown) that provides an image as an array of pixels. In a manner well known in the imaging arts, spatial light modulator 36 cooperates with a light source 34 and a polarizing beamsplitter 38 to form an image that is input to a relay lens assembly 54.

Relay lens assembly 54, which can consist of a number of component lenses as is shown in FIG. 2A, directs light received from image generator 74 onto a diffusing element 32. A left or right intermediate image 76*l*/76*r* is formed on a curved diffusive surface 40 of diffusing element 32. A projection system 72 comprises curved diffusive surface 40 and a ball lens assembly 30. A stereoscopic projection system 82 comprises both a left projection system 72*l* and a right projection system 72*r*. For both left and right projection systems 72*l*/72*r*, ball lens assembly 30 projects left or right intermediate image 76*l*/76*r* to front focal surface 22 of curved mirror 24 through a beamsplitter 16. Curved mirror 24 forms a stereoscopic virtual image that appears, to observer 12, to be "behind" curved mirror 24.

Figure 2B:
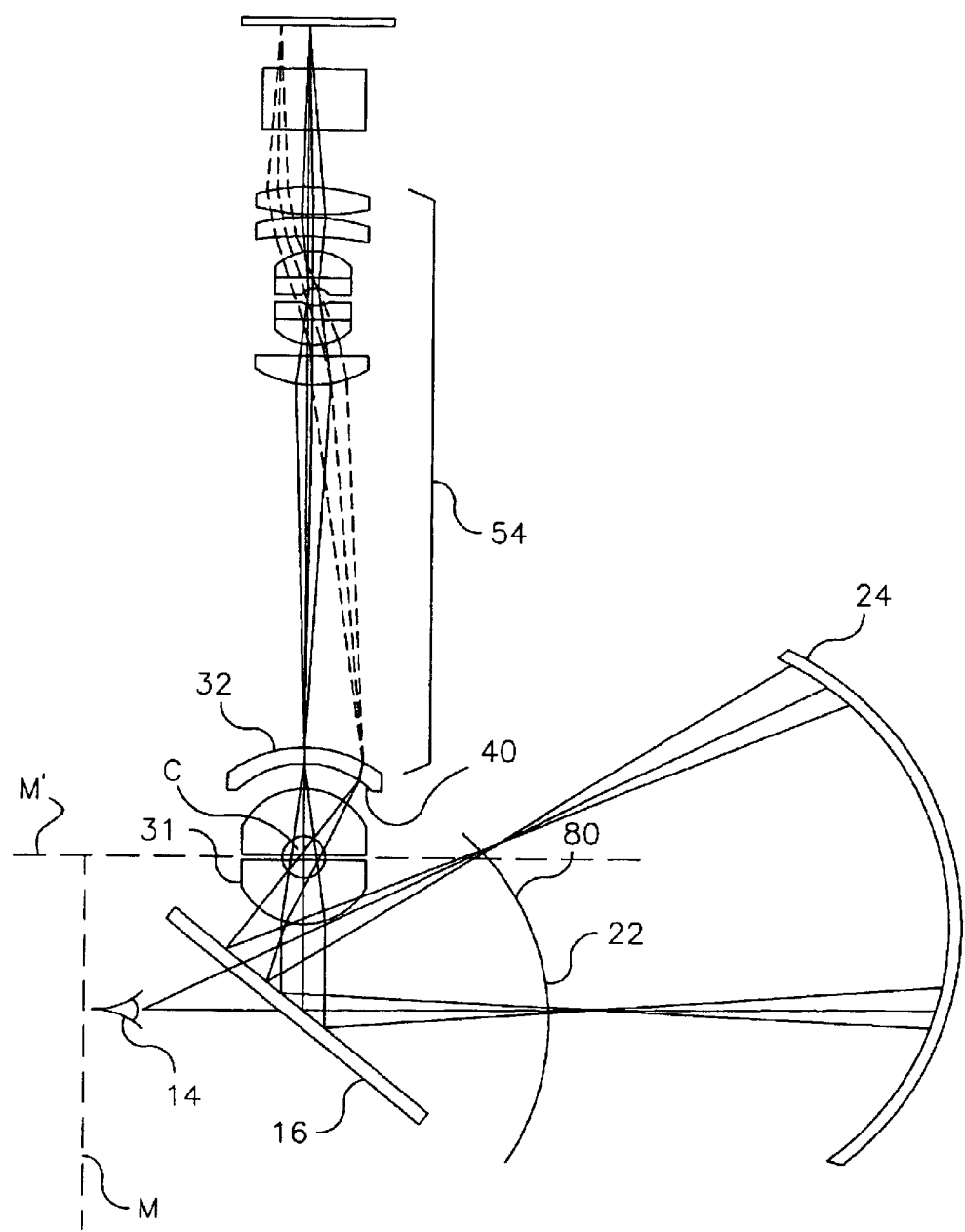
Figure 4:
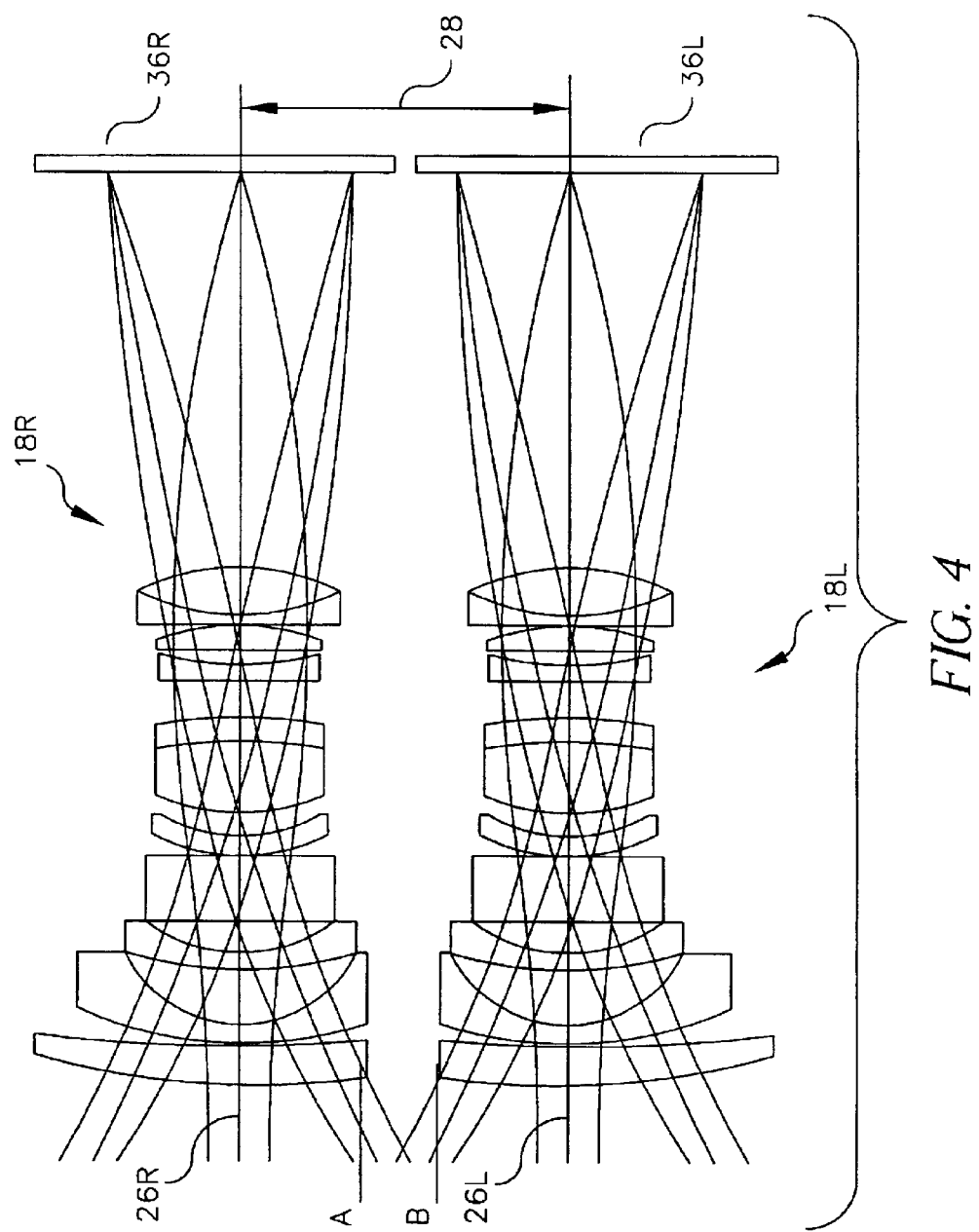
FIG. 4 is a cutaway view showing a conventional implementation for wide angle projection lenses for right-eye and left-eye image projection.

It can be appreciated that the arrangement of components shown in FIGS. 1, 2A, and 2B present a novel approach to the challenge of achieving wide field of view with a projection lens. By way of illustration, FIG. 4 shows how a conventional approach to stereoscopic projection lens design would be implemented. As FIG. 4 shows, conventional lens design techniques require the manufacture of fairly complex left-eye and right-eye lens assemblies 18*l*, 18*r*. In order for lens assemblies 18*l* and 18*r* to project properly to each eye, lens assemblies 18*l* and 18*r* must have their respective optical axes 26*l*, 26*r* within an appropriate interocular distance 28 (that is, the distance between right and left eyes of observer 12, nominally in the 60–70 mm range). This requires some truncation of lens assembly 18*l* and 18*r* components, as indicated by dotted lines A and B in FIG. 4. It can be appreciated by those skilled in the optical arts that conventional solutions such as that shown in FIG. 4 can be costly and difficult to design and manufacture. In the present invention, as is best shown in FIGS. 2A, 2B, and FIG. 5, lens assembly 18*l*/18*r* is replaced by projection system 72, which comprises a small number of components by comparison.

Figure 5:
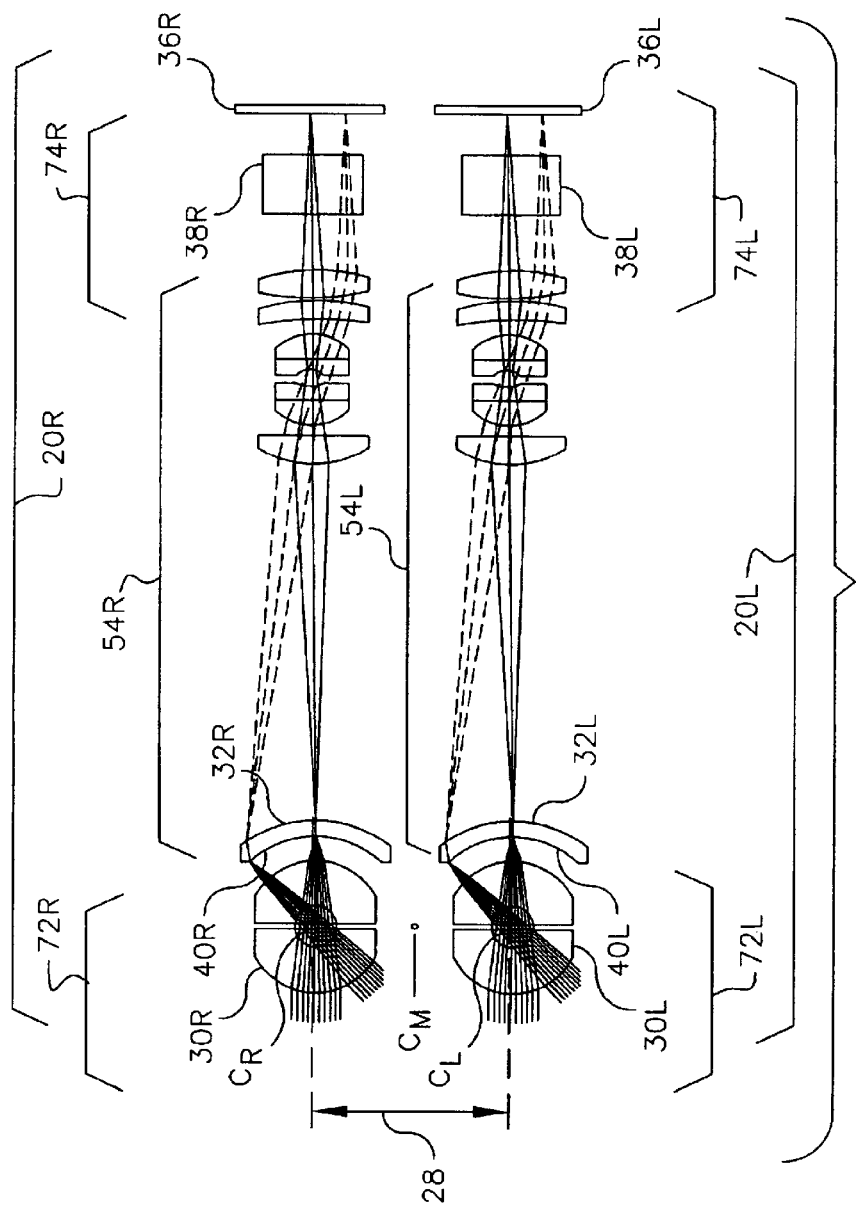
FIG. 5 is a schematic layout showing left-eye and right-eye projection systems in a preferred embodiment.

In contrast to the conventional approach as partially illustrated in FIG. 4, FIG. 5 shows another schematic view of left and right optical systems 20*l*, 20*r* of the present invention. Left and right optical systems 20*l* and 20*r* provide cooperating projection systems with axes that are not necessarily parallel but, rather, directed towards a distant converging point. As described for FIGS. 2A and 2B, relay lens assemblies 54*l* and 54*r* form left and right intermediate images 76*l* and 76*r* respectively on curved diffusive surfaces 40*l* and 40*r*. To provide a viewable stereoscopic image over a large range of human interocular separations, ball lens assemblies 30*l*, 30*r* are advantageously separated by an averaged, empirically determined interocular distance 28. Typical interocular distances are 55 mm to 75 mm. A preferred embodiment is 60 mm to 70 mm with 65 mm being optimal.

Operation of Ball Lens Assembly 30

Figure 3:
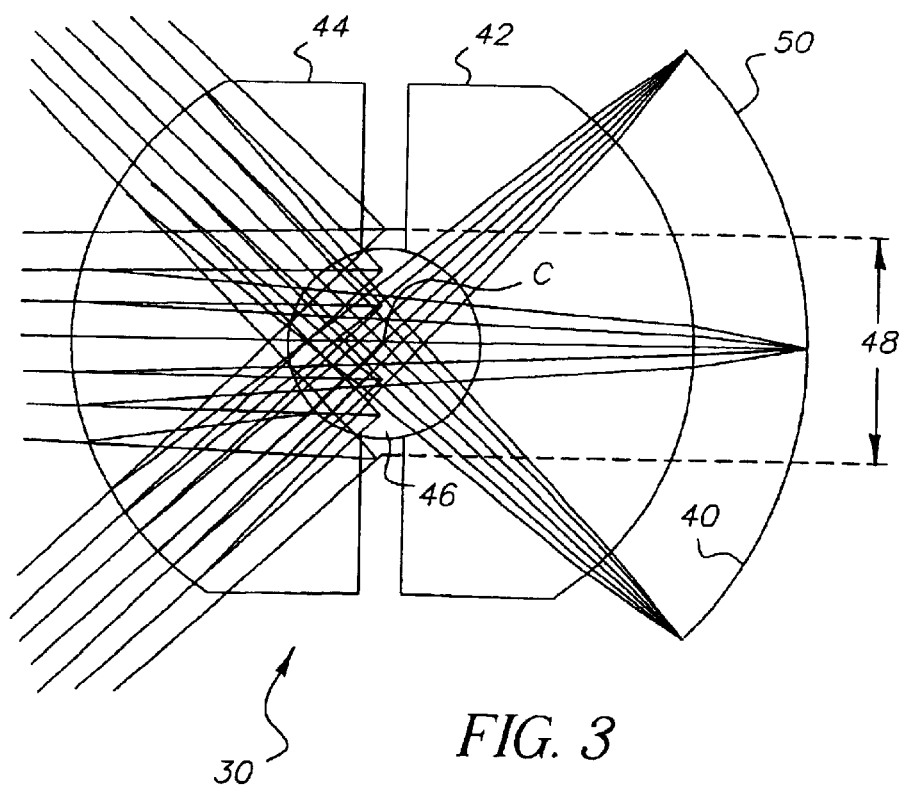
FIG. 3 is a cutaway view illustrating the concentric arrangement of a ball lens and diffusing surface at the intermediate image plane with a conventional glass lens.

Ball lens assembly 30*l*/30*r* functions as the projection lens for its associated left or right optical system 20*l*/20*r*. Referring to FIG. 3, there is shown the concentric arrangement provided for each ball lens assembly 30. A central spherical lens 46 is disposed between meniscus lenses 42 and 44, where meniscus lenses 42 and 44 have indices of refraction and other characteristics intended to minimize on-axis spherical and chromatic aberration, as is well known in the optical design arts. Exit pupils 48 limit the entrance pupil within ball lens assembly 30. Exit pupils 48 need not be physical, but may alternately be implemented using optical effects such as total internal reflection. In terms of the optics path, exit pupils 48 serve to define an exit pupil for ball lens assembly 30.

In one embodiment, meniscus lenses 42 and 44 are selected to reduce image aberration and to optimize image quality for the image projected toward curved mirror 24. It must be noted that ball lens assembly 30 could comprise any number of arrangements of support lenses surrounding central spherical lens 46. Surfaces of these support lenses, however many are employed, would share a common center of curvature C with central spherical lens 46. Moreover, the refractive materials used for lens components of ball lens assembly 30 could be varied, within the scope of the present invention. For example, in addition to standard glass lenses, central spherical lens 46 could comprise a plastic, an oil or other liquid substance, or any other refractive material chosen for the requirements of the application. Meniscus lenses 42 and 44, and any other additional support lenses in ball lens assembly 30, could be made of glass, plastic, enclosed liquids, or other suitable refractive materials, all within the scope of the present invention. In its simplest embodiment, ball lens assembly 30 could comprise a single central spherical lens 46, without additional supporting refractive components.

Referring again to FIG. 3, curved diffusive surface 40 is concentric with ball lens assembly 30, centered at C. This concentric arrangement minimizes field aberrations for projection of the left/right intermediate image 76l/76r formed on curved diffusive surface 40. Curved diffusive surface 40 can be considered as a myriad set of dispersive point sources 50, whose rays are received by ball lens assembly 30. By providing an intermediate image on curved diffusive surface 40, LaGrange invariant constraints on exit pupil size and field angle are effectively overcome. In terms of components shown in FIG. 1, curved diffusive surface 40 acts as an interface to match the low LaGrange invariant that is characteristic of image generation system 70 with the high LaGrange invariant of stereoscopic projection system 82. By overcoming LaGrange invariant constraints, the use of curved diffusive surface 40 thus allows wide angle projection of the image by ball lens assembly 30.

The function of curved diffusive surface 40 is to diffuse the light relayed from relay lens assembly 54, but with as much brightness as possible, for projection at a wide image angle by ball lens assembly 30. To allow eventual viewing of the projected image by observer 12, it is important that each dispersive point source 50 effectively fill exit pupil 48 of ball lens assembly 30. If this is achieved, observer 12, with eyes positioned at viewing pupils 14l/14r, can view the entire projected image from any point within viewing pupils 14l/14r.

Diffusing element 32 is a lens coated in order to provide curved diffusive surface 40. Suitable diffusive coatings and treatments for curved diffusive surface 40 are known to those skilled in the optical arts. Alternately, curved diffusive surface 40 could be ground, etched, or treated in some other way in order to provide the needed diffusive characteristics. The curvature of curved diffusive surface 40 is concentric with the curvature of ball lens assembly 30 in order to provide an image for projection that has no field aberrations and has minimum on-axis aberration.

Figure 7:
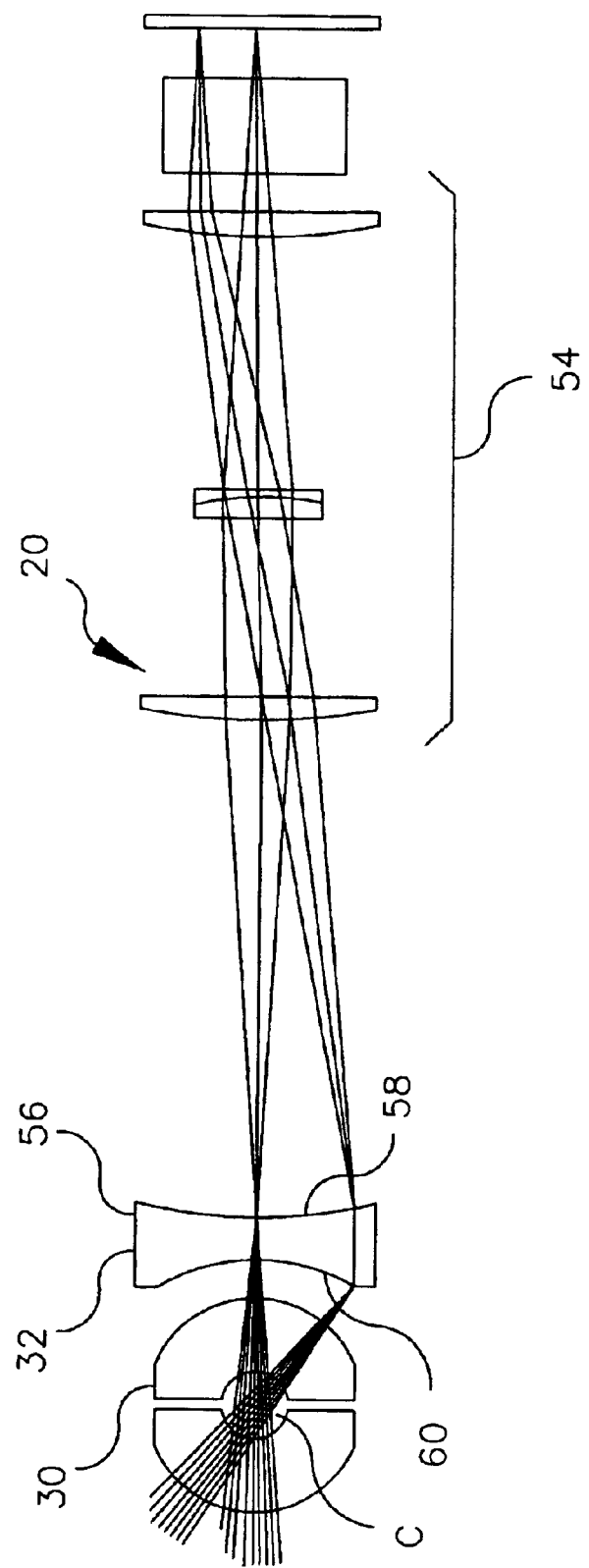
FIG. 7 shows an alternate embodiment for a projection optics assembly, using a double-concave fiber faceplate as diffusive surface.

In an alternate embodiment, diffusive surface 40 could be implemented using a fiber optic faceplate 56, as is shown in FIG. 7, such as those manufactured by Incom, Inc., Charlton, Mass. Typically used in flat panel display applications, fiber optic faceplates 56 transfer an image from one surface to another. As part of optical system 20, fiber optic faceplate 56 would have a double-concave shape. The left or right intermediate image 76l/76r would be focused on an input concave surface 58 and be transferred to an output concave surface 60 that comprises curved diffusive surface 40. Output concave surface 60 can be treated using a number of techniques familiar to those skilled in the optical arts for enhancing the performance of curved diffusive surface 40. Surface treatments could be achieved, for example, using various grinding, buffing, etching, or other techniques that result in a diffusive surface, or using a holographic grating, for example. A diffusive coating could alternately be applied to output concave surface 60.

Figure 15A:
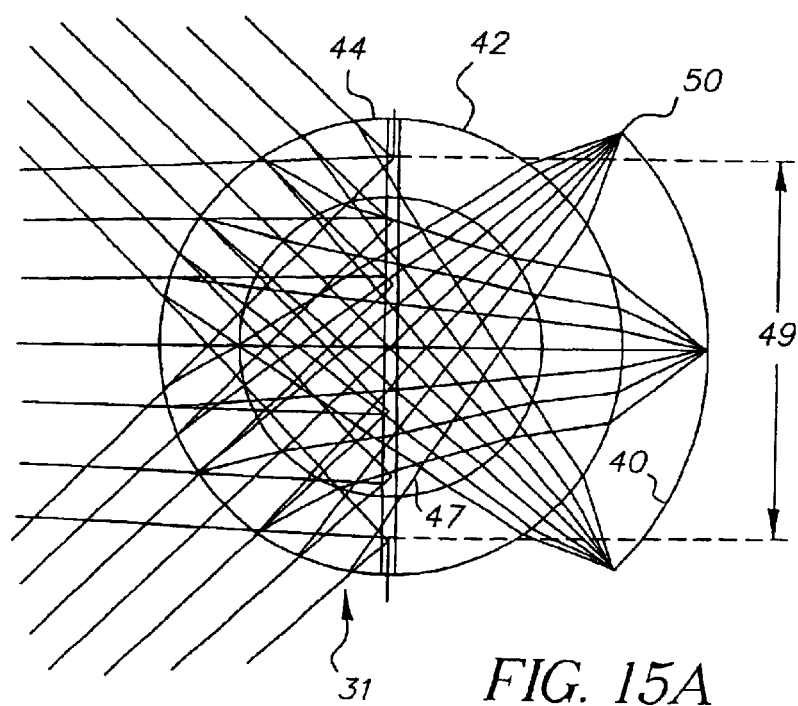
FIG. 15A is a cutaway view of a ball lens with spherical gradient-index material according to the present invention.

A spherical gradient-index ball lens, shown in FIG. 15A provides additional advantages over a standard ball lens shown in FIG. 3. A spherical gradient-index ball lens assembly 31 is comprised of spherical gradient-index ball lens 47 and conventional meniscus lens 42 and 44. Spherical gradient-index ball lens 47, shown in FIG. 15A has a reflective index distribution:

$$n(r)=f(r)$$

r is the distance from the center point of the ball lens. It has spherical symmetry about the origin. For example:

$$n(r)=n_0+n_1 r+n_2 r^2+n_3 r^3+n_4 r^4$$

A spherical gradient-index lens, shown in FIG. 15A, is a generalized Luneburg Lens. Luneburg lens was introduced by R. K. Luneburg in 1944, and extended by S. P. Morgan in 1958. (R. K. Luneburg, "Mathematical Theory of Optics," Brown University, Providence, R.I. (1944); S. P. Morgan, "General Solution of the Luneburg Lens Problem" J. Appl. Phys. 29, 1358–1368 (1958); and E. W. Marchand, "Gradient Index Optics," Academic Press, New York (1978)).

Figure 14:
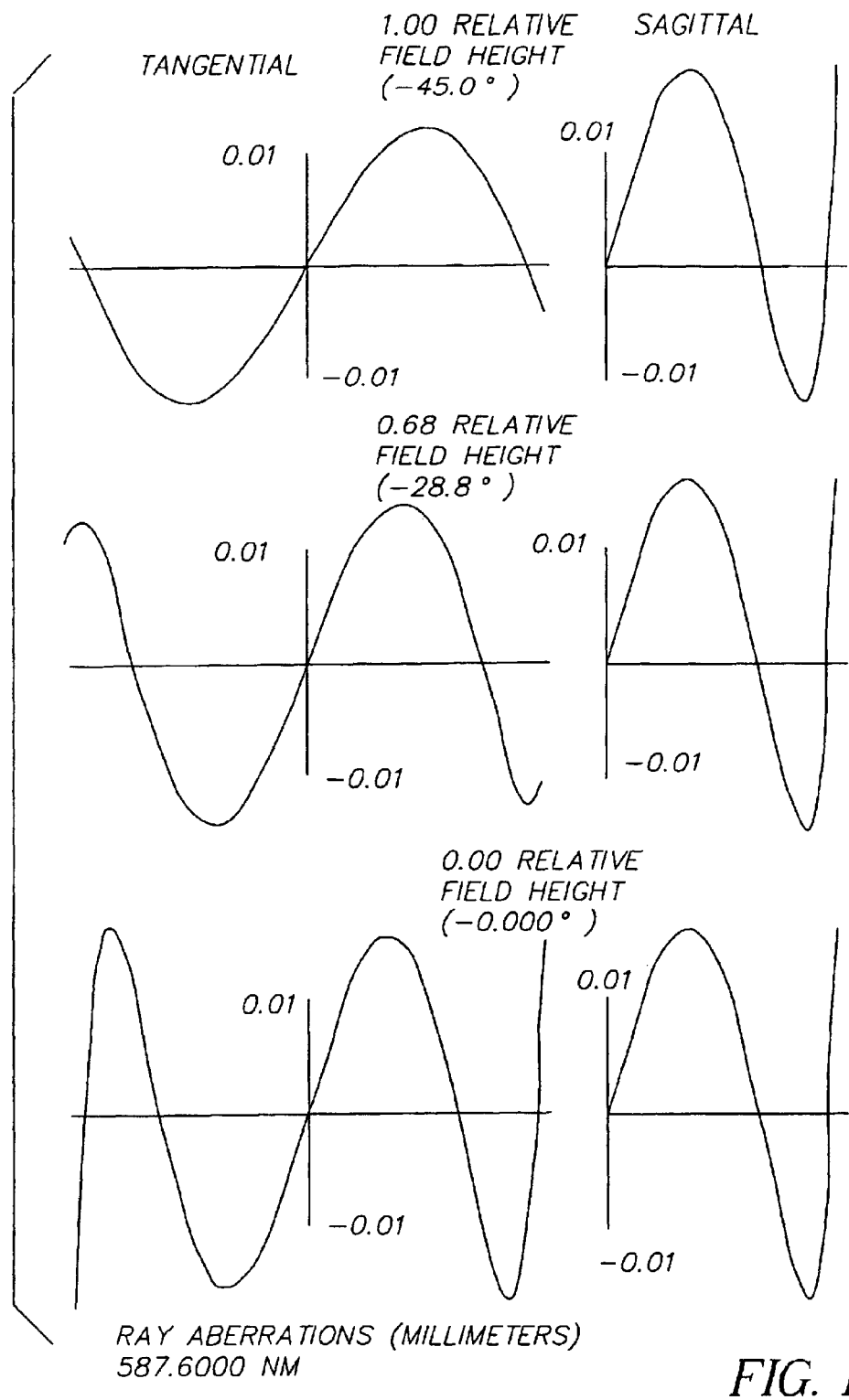
FIG. 14 is a ray fan of the ball lens shown in FIG. 3.
Figure 15B:
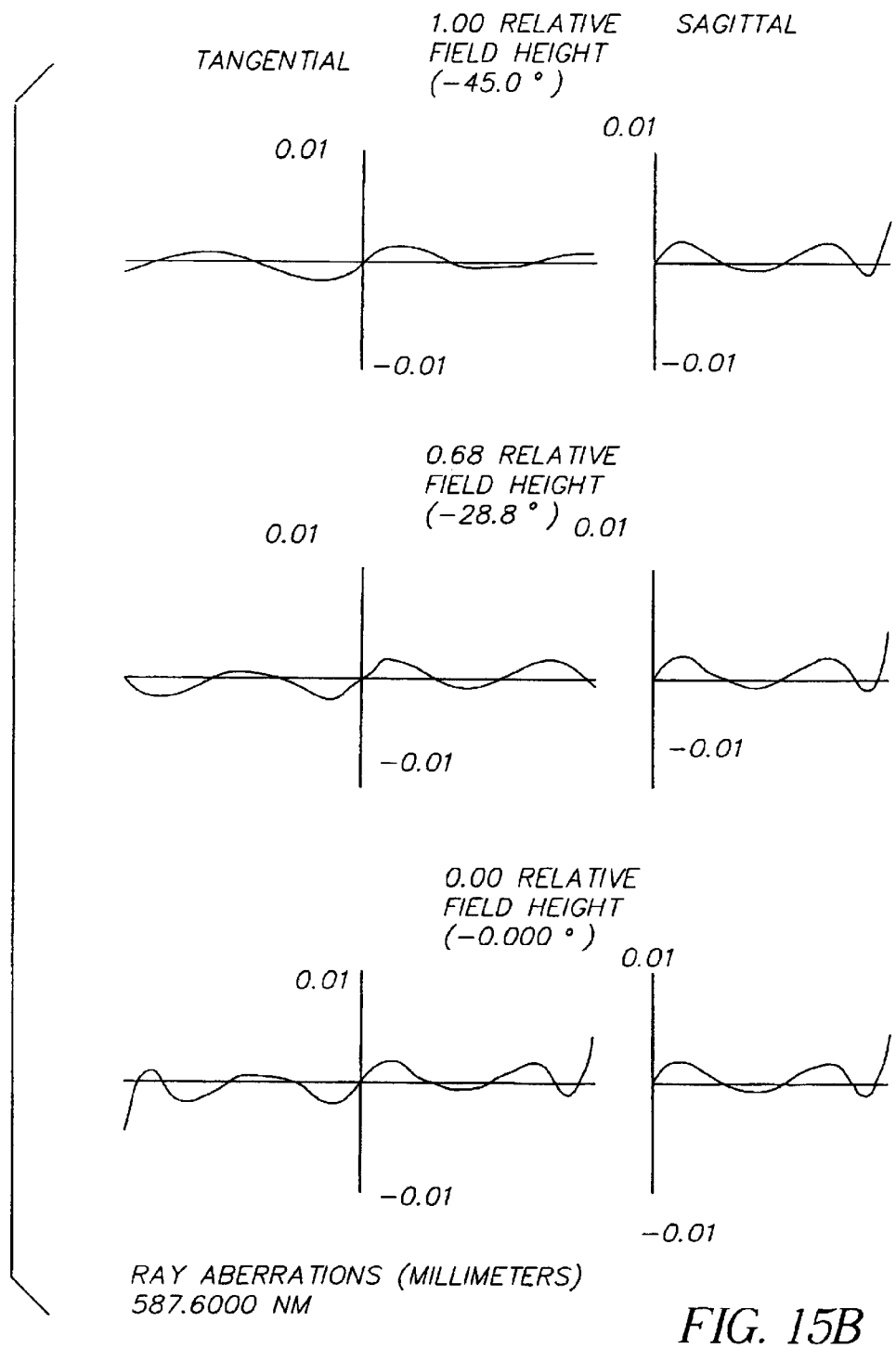
FIG. 15B is a ray fan of the ball lens shown in FIG. 15A.

Spherical gradient-index ball lens has potential applications in imaging and non-imaging optics, the former for producing aberration-free images and the latter for realizing fundamental upper bounds on concentration. Using a spherical gradient-index ball lens, the present invention obtains an aberration-free image and large exit pupil 49, for example, φ45 mm, shown in FIG. 15A. As a comparison, the exit pupil of conventional glass ball lens in FIG. 3 is only about φ23 mm. FIG. 14 and FIG. 15B are the ray fan plots with the same unit for conventional glass and spherical gradient-index ball lenses, respectively. The ray fan plots clearly show that the spherical gradient-index ball lens has much smaller spherical aberration than the conventional glass ball lens; the corresponding RMS spot size is 2.31 $\mu$m for spherical gradient-index design and 24 $\mu$m for conventional design.

Figures 16, 17:
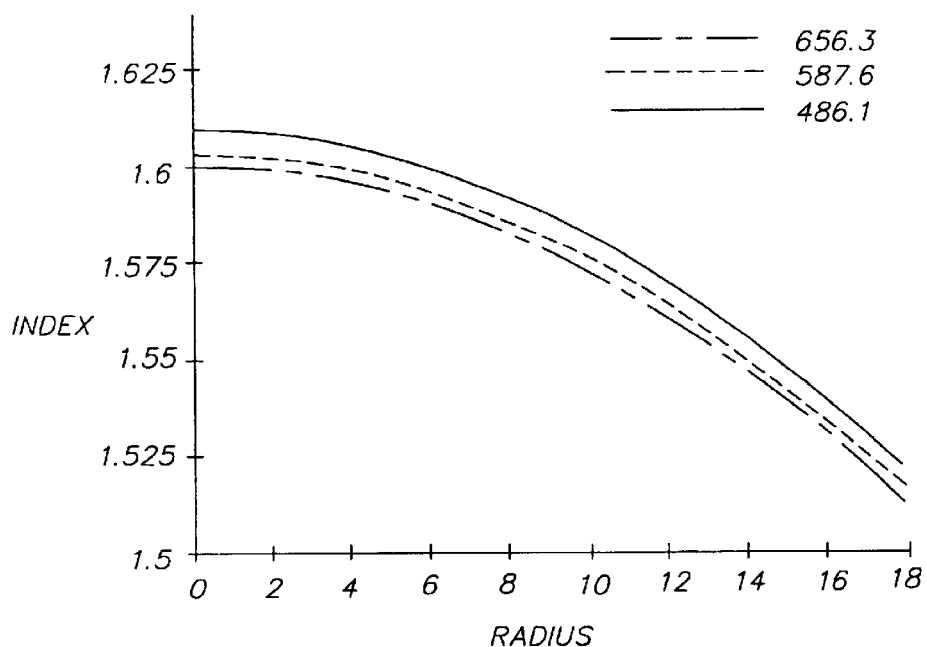
FIG. 16 is a table of coefficients of the spherical gradient-index ball lens shown in FIG. 15A.
FIG. 17 is an index profile of the spherical gradient-index ball lens shown in FIG. 15A.

One example of the index coefficiencies of the spherical gradient-index ball lens 47 with a radius of 18 mm shown in FIG. 15A is listed in Table I, FIG. 16. The index profile is plotted in FIG. 17. Thus, it is seen that for the spherical gradient-index ball lens 47 used in this example, the index of refraction of the material for different wavelengths decreases from the center of ball lens to the edge of the ball lens.

Monocentric Design of Image Path

Figure 6:
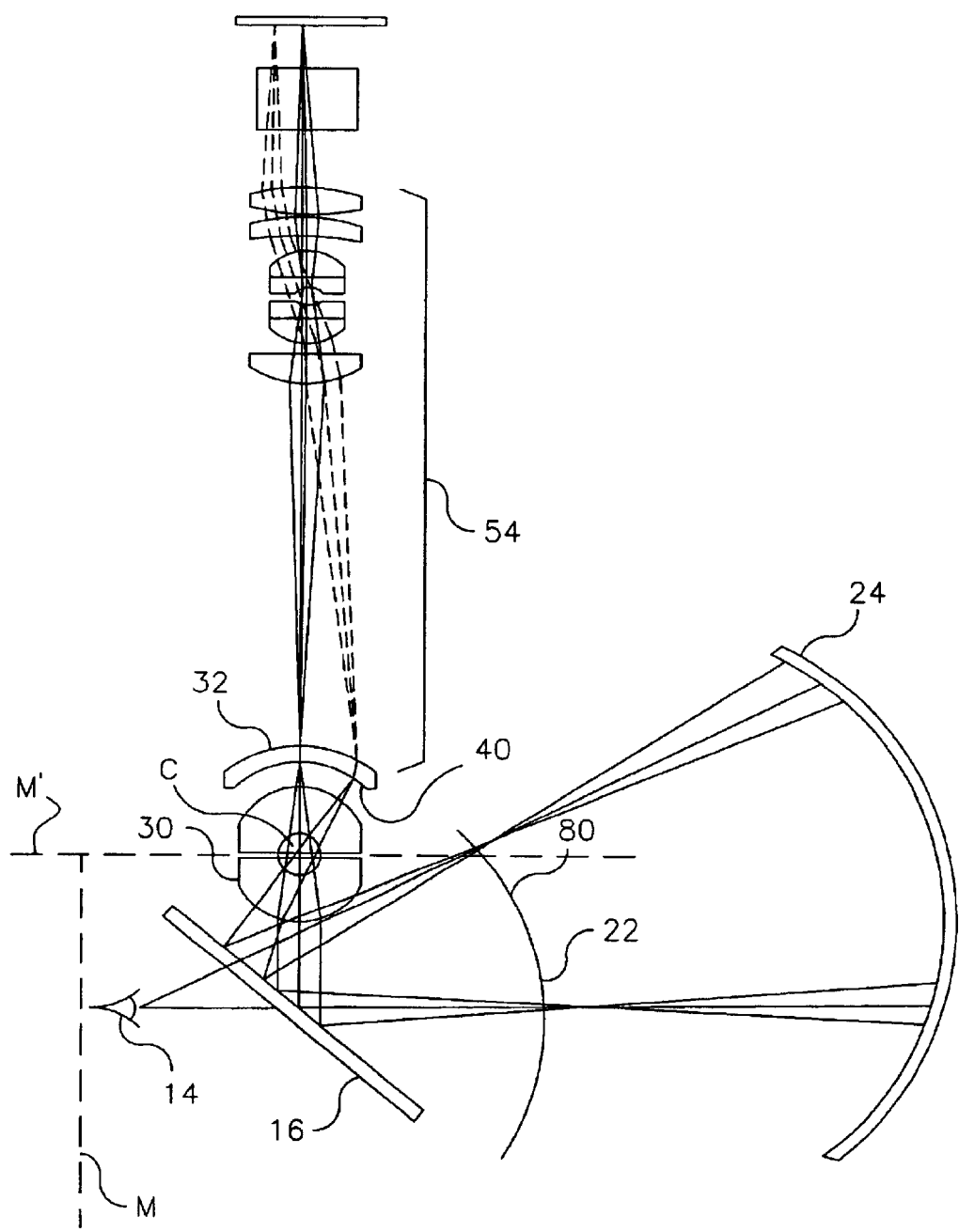
FIG. 6 shows a schematic layout in vertical cross-section of one of the two projection systems with the curved mirror and beamsplitter, relative to observer position.

The present invention utilizes the inherent advantages provided by a monocentric arrangement of the image path about monocentric axis M and it's optical equivalent $M^1$ as shown in FIG. 1. Referring to FIG. 6, there is shown a vertical cross section of the optics path in autostereoscopic imaging system 10. The image from spatial light modulator 36 is relayed onto curved diffusive surface 40l/40r as left or right intermediate image 76l/76r, as described above. Left/right intermediate image 76l/76r on curved diffusive surface 40 is projected by ball lens assembly 30 and reflected by beamsplitter 16 to form the stereoscopic intermediate curved image 80 comprising left and right curved images 80l and 80r near front focal surface 22 of curved mirror 24. Stereoscopic intermediate curved image 80, itself a real image, is substantially collimated by curved mirror 24 to present a virtual image to observer 12. By means of beamsplitter 16 and curved mirror 24, the exit pupil of ball lens assembly 30 is imaged at unity magnification to viewing pupil 14. It must be noted that the design of the present invention is optimized for unity magnification, however, some variation from unity magnification is possible, within the scope of the present invention.

A common center of curvature is provided at center C of ball lens assembly 30. This point serves as center of curvature for ball lens assembly 30 with its component meniscus lenses 42 and 44 and for curved diffusive surface 40. Because it is imaged at viewing pupil 14, center C provides an approximate center of curvature for curved mirror 24, as described subsequently.

Referring to FIG. 5, it can be seen that left and right ball lens assembly 30l/30r each have a center, respectively annotated as $C_L$ and $C_R$, with these centers separated by interocular distance 28. The actual center of curvature of mirror 24, annotated C m is halfway between Cl and Cr.

Thus, the arrangement of the image path is substantially monocentric about axis M, with necessary adjustment, that is, averaging, of some coordinates to locate a center point. Due primarily to interocular separation, geometrically perfect monocentricity cannot be achieved. However, interocular distance 28 is relatively small considering the overall scale of the system and effectively allows spacing of viewing pupils 14l, 14r to each side of a true center point.

Curved Mirror 24 Arrangement

Due again to interocular distance 28, the precise shaping of curved mirror 24 can be adjusted to vary to some degree from a precise spherical shape. An aspheric shape could be used for curved mirror 24, to minimize off-axis pupil aberration, for example.

Figure 9:
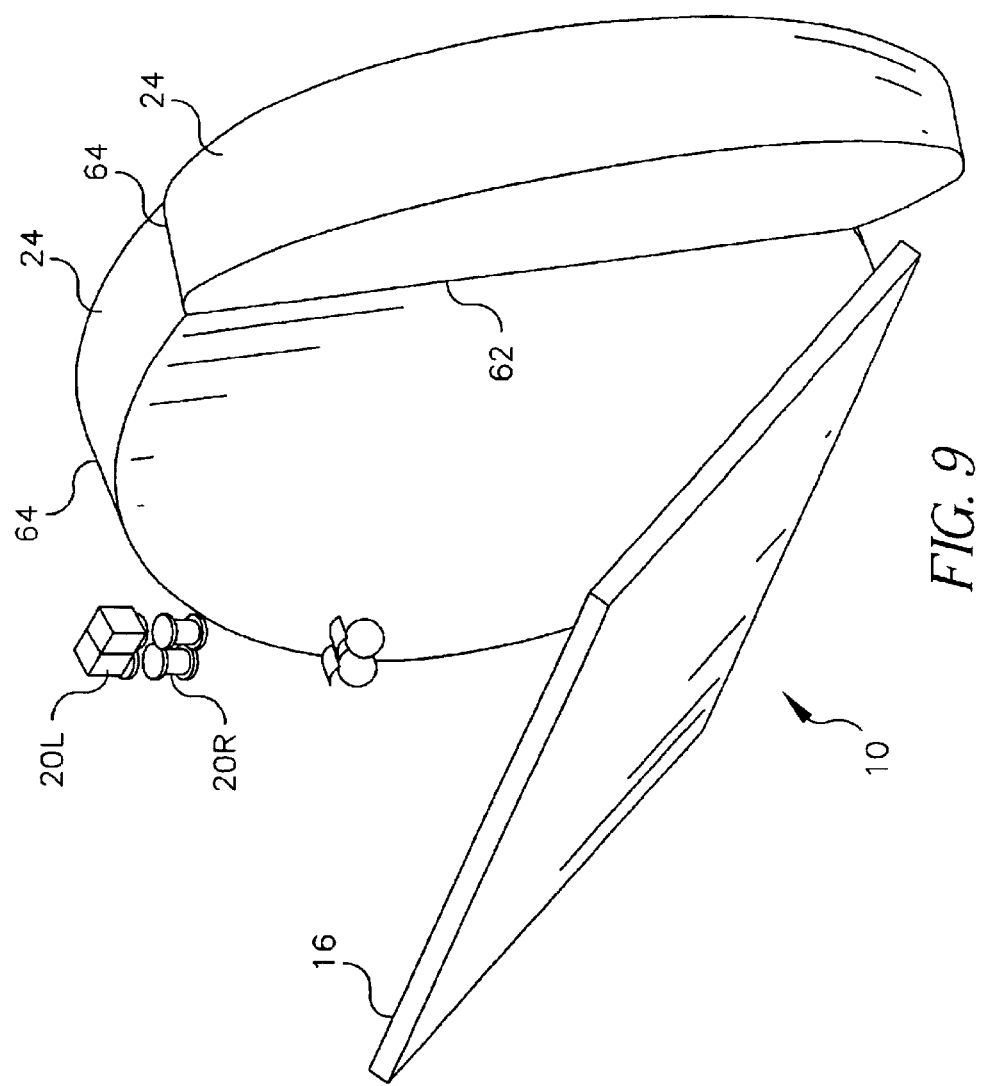
FIG. 9 shows a segmented, curved mirror in which segments share substantially the same center of curvature.

Curved mirror 24 can be a fairly expensive component to fabricate using traditional forming, grinding, and polishing techniques. It may be more practical to fabricate mirror 24 from two or more smaller mirror segments, joined together to assemble one large mirror 24. Referring to FIG. 9, there is shown beamsplitter 16, optical systems 20l, 20r, wherein curved mirror 24 constructed using two or more segments 64, each segment 64 being spherical and each segment 64 trimmed to join another segment 64 along a seam 62. With this arrangement, centers of curvature of each segment 64 would overlap each other.

As yet another alternative embodiment, curved mirror 24 may comprise a membrane mirror, such as a stretchable membrane mirror (SMM), whose curvature is determined by a controlled vacuum generated in an airtight cavity behind a stretched, reflective surface. Use of a stretchable membrane mirror is disclosed in the McKay article, referenced above. Curved mirror 24 can alternately be embodied using replicated mirrors, Fresnel mirrors, or using one or more or retroreflective surfaces.

Figure 8A:
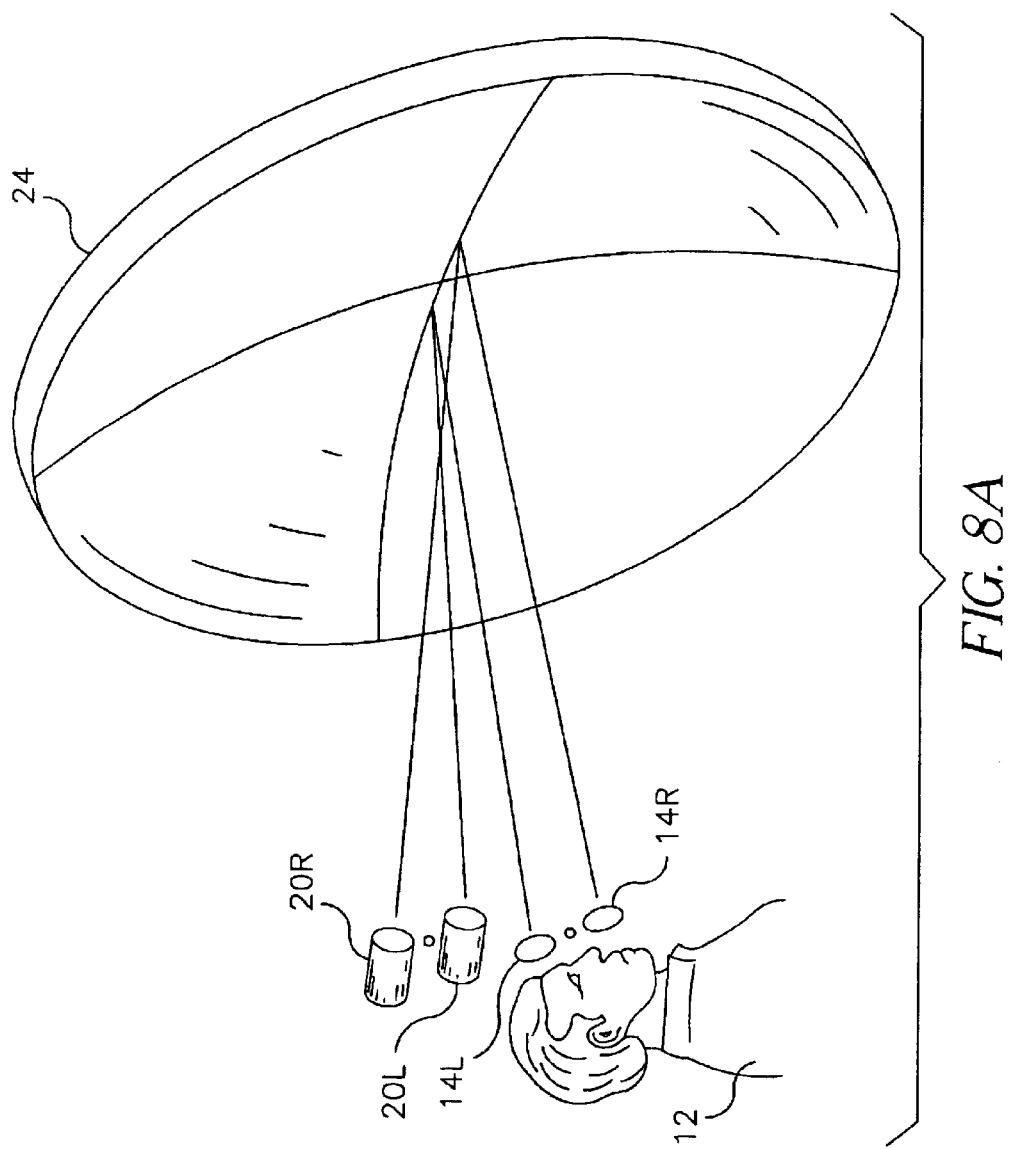
FIG. 8A shows an alternate embodiment in which projection systems direct light onto a curved mirror, without an interposed beamsplitter.

Referring to FIG. 8A, there is shown an alternate substantially monocentric arrangement in which left and right optical systems 20l and 20r project directly into curved mirror 24, without the use of beamsplitter 16 as was shown in FIGS. 1, 2, 6, and 9.

The arrangement of FIG. 8A a requires that curved mirror 24 have acceptable off-axis performance, since the image path for each viewing pupil 14l and 14r must be slightly off-center. Large or aspheric mirrors could be employed, in conjunction with optical system 20 comprising ball lens assembly 30 for wide angle imaging. In order for the arrangement shown in FIG. 8A to perform satisfactorily when using a spherical curved mirror 24, the ratio of off-axis distance to mirror 24 focal length must be small. As a rule-of-thumb, it has been determined that curved mirror 24 having a spherical surface would perform satisfactorily provided that the off-axis angle does not exceed approximately six degrees.

Figure 8B:
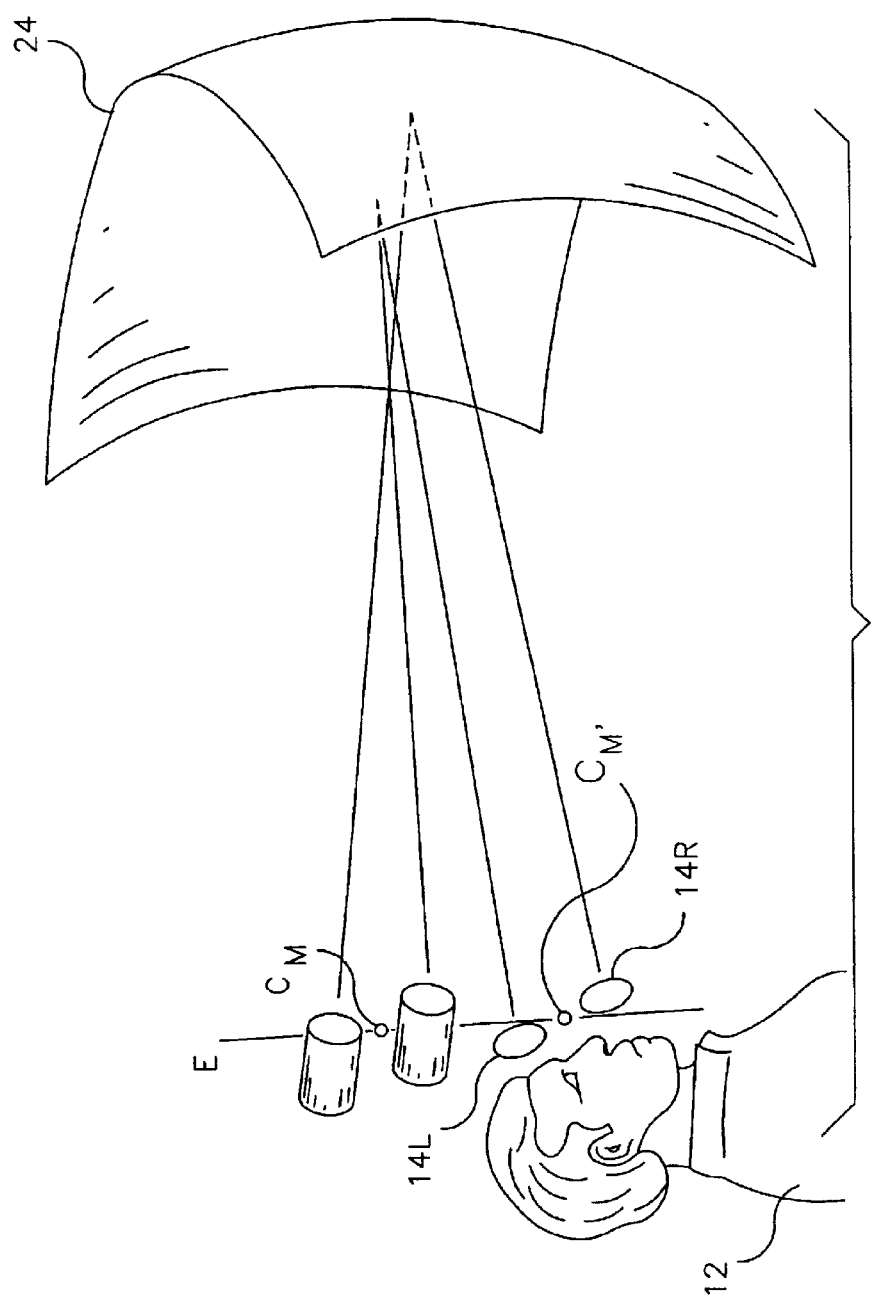
FIG. 8B shows an alternative embodiment in which the curved mirror is aspherical.

For off-axis angles in excess of six degrees, use of a curved mirror 24 having an aspherical surface would be more suitable, as is shown in FIG. 8B. Center of curvature point $C_{M'}$ is chosen to be midway between viewing pupils 14l and 14r. Center of curvature point $C_M$ in FIG. 5 is midway between center points $C_L$ and $C_R$ of ball lens assemblies 30l/30r. Such an aspherical design could be toroidal and would be monocentric with respect to axis E which passes through points $C_M$ and $C_{M'}$. In cross-section, curved mirror 24 fabricated in this manner would be elliptical, with points $C_M$ and $C_{M'}$ serving as foci of the ellipse.

Figure 10:
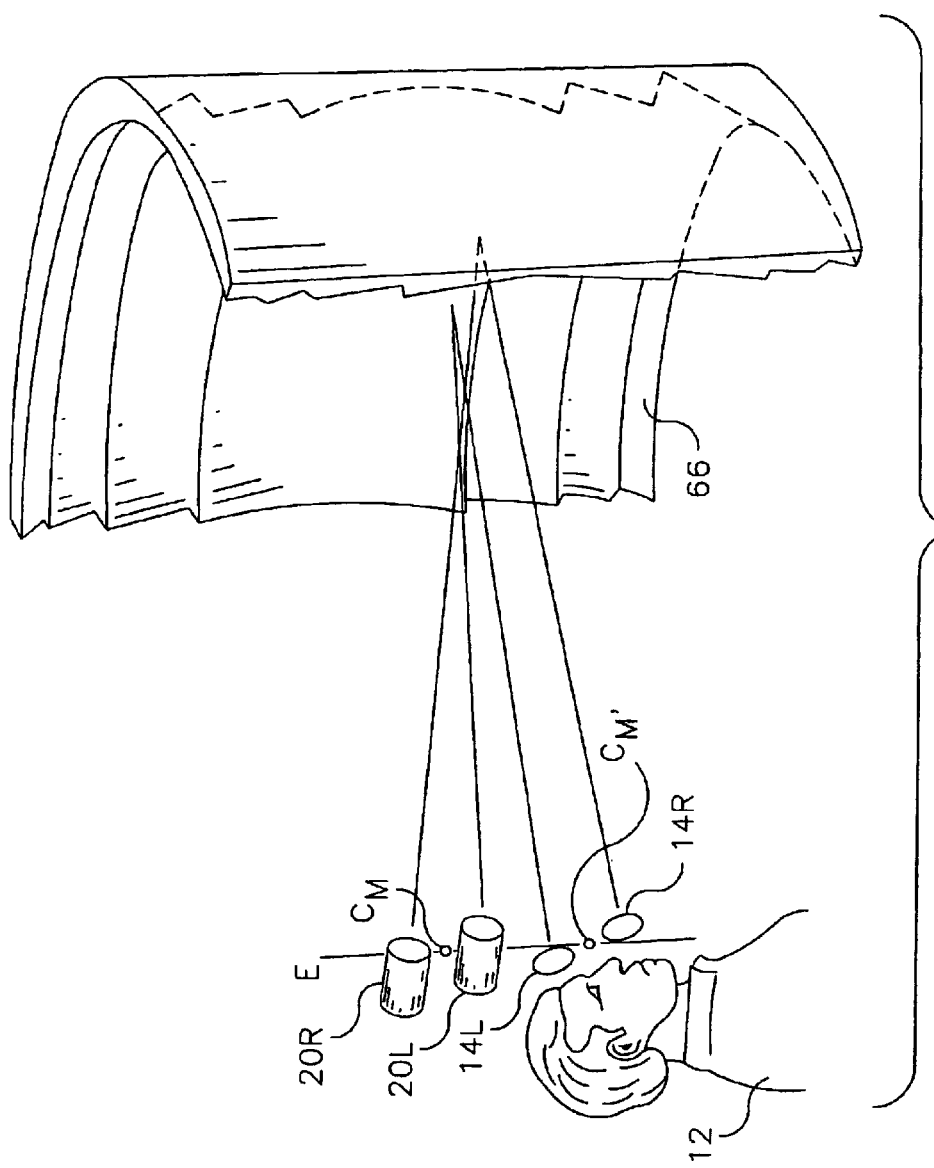
FIG. 10 shows an alternate embodiment using a cylindrically curved, reflective Fresnel lens in place of a curved mirror.

Referring to FIG. 10, there is shown yet another alternate arrangement similar to that shown in FIG. 8B. In FIG. 10, curved mirror 24 is implemented using a cylindrically curved, reflective Fresnel mirror 66. The arrangement of components shown in FIG. 10 is monocentric with respect to monocentric axis M, as was shown in FIG. 8B. Reflective Fresnel mirror 66 has power in only one direction. Reflective Fresnel mirror 66 can be, for example, a planar element fabricated on a flexible substrate, similar to Fresnel optical components manufactured by Fresnel Optics, Rochester, N.Y. Fresnel mirror 66 would be curved into a generally cylindrical shape about axis E, as is shown in FIG. 10. Fresnel mirror 66 would image the exit pupils of ball lens assemblies 30l/30r onto viewing pupils 14l/14r in a similar manner to that described above for curved mirror 24. Optical systems 20l/20r would be optimized to accommodate Fresnel mirror 66 performance characteristics.

As yet another option, curved mirror 24 could be replaced using a retroreflective surface, such a surface having an essentially spherical shape with center of curvature coincident with that of ball lens assembly 30. A retroreflective surface would not introduce the image-crossing effect caused by curved mirror reflection. It must be noted, however, that this alternate arrangement would provide a real image, not the virtual image formed by autostereoscopic imaging system 10 in the preferred embodiment.

Image Source Alternatives

Spatial light modulator 36 of the preferred embodiment can be one of a number of types of devices. Exemplary spatial light modulators 36 include, but are not limited to, the following types:

(a) liquid crystal device (LCD). Widely used in projection apparatus for electronically generated images, LCDs selectively modulate the intensity of an incoming optical beam from a light source 34 (FIG. 1) in a space-wise fashion, through individual array elements that produce the individual pixels displayed. LCDs can be either transmissive or reflective. The preferred embodiment uses reflective LCDs.

(b) digital micromirror device (DMD) from Texas Instruments, Dallas, Tex. This type of reflective device could alternately be employed to modulate an optical beam from a light source 34.

(c) Scanning devices that create a 2-D image using successive scans from a point source or from a linear array. Such scanning devices could comprise a scanning laser or CRT, which generate images from point sources. Such a point source could be used, for example, to write left or right intermediate image 76l/7r onto diffusive surface 40. Alternately, a scanning device could comprise a linear device such as a grating light-valve (GLV), such as those manufactured by Silicon Light Machines, Sunnyvale, Calif.

The above listing is representative only; other types of spatial light modulators 36 or other image sources could alternately be employed to provide the source image, within the scope of the present invention.

It is important to note that telecentric behavior of relay lens assembly 54 is important for distortion-free imaging.

For clarity, only a single spatial light modulator 36 is represented for each left and right optical system 20l/20r in FIGS. 1, 2, 5, 6, and 7. In actual autostereoscopic imaging system 10, each color component (typically red, green, and blue, RGB) could require one spatial light modulator 36. Corresponding light sources 34 would be provided in the component light colors, as is well known in the electronic imaging art. The different image planes would be combined in order to provide left and right intermediate images 76l/76r in color at left and right curved diffusive surfaces 40l/40r. In a preferred embodiment, one spatial light modulator 36 having an integral color filter array is used, as is familiar to those skilled in the art. As another alternate embodiment, a color sequential arrangement of R, G, and B components could be provided from one spatial light modulator 36. Fortunately, light levels required for autostereoscopic imaging system 10 using pupil imaging, as disclosed herein, are relatively low, relaxing a well-known constraint typical with imaging filters, susceptible to photo-degradation over time.

In an alternate embodiment, the function of providing an intermediate image at curved diffusive surface 40 could be performed without using spatial light modulators 36 and associated support optics. However, the limitation for optimum stereoscopic representation is that the intermediate image formed at the position of curved diffusive surface 40 must be curved, with the center of curvature for this alternate curved diffusive surface 40 coincident with center C of ball lens assembly 30, as is described above in reference to FIG. 6.

Figure 12:
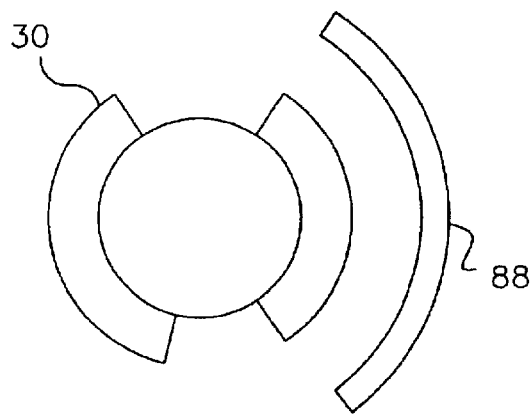
FIG. 12 shows an alternate embodiment in cross section, using a spherically curved emissive image-forming surface.

Referring to FIG. 12, an emissive image forming surface 88 could be employed as an alternative. For example, an organic light emitting diode (OLED), available from eMagin Corporation, Hopewell Junction, N.Y., could be used as emissive image forming surface 88. Similarly, Polymer Light Emitting Diode (PLED) technology could be employed. For this application, OLED or PLED array technology allow an image surface available on a flexible, flat panel that could be molded to have a spherical curvature coincident with center C of ball lens assembly 30, as is shown in the cross-sectional view of FIG. 12. Here, an OLED or PLED array comprising emissive image forming surface 88, curved mirror 24, and ball lens assembly 30 would be monocentric with respect to the same symmetry axis.

Figure 13:
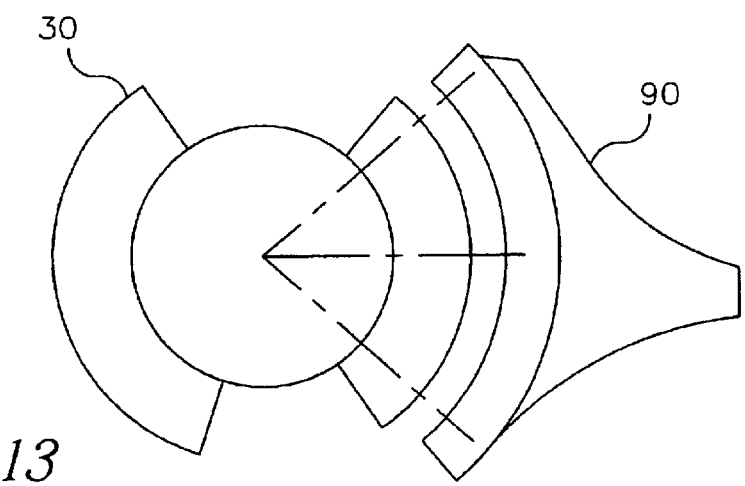
FIG. 13 shows an alternate embodiment using a cathode-ray tube (CRT) having a curved image-forming surface.

Referring to FIG. 13, a cathode-ray tube (CRT) 90 could be employed to provide emissive image forming surface 88. This would require a change of curvature from standard off-the-shelf CRT manufacture, to provide the proper shape for cathode-ray tube 90.

Figure 11:
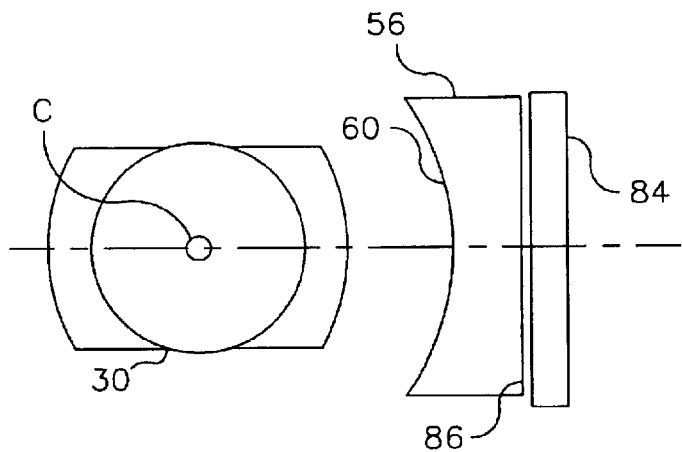
FIG. 11 shows another alternate embodiment in cross section, using a flat emissive image-forming surface with a fiber faceplate.

As yet another alternative, a flat image-forming emissive surface 84 could be employed, in conjunction with a fiber optic faceplate 56, as is shown in FIG. 11. Fiber optic faceplate 56 would require a flat surface 86 facing such an emissive surface, with output concave surface 60 facing ball lens 30 and concentric with center C, as was also used in the alternate embodiment of FIG. 7.

The preferred embodiment of the present invention provides an exceptionally wide field of view for stereoscoping imaging in excess of the 90 degree range, with viewing pupil 14 size near 20 mm. Moreover, ball lens assembly 30 provides excellent off-axis performance and allows a wider field of view, possibly up to 180 degrees. This provides an enhanced viewing experience for observer 12, without requiring that headset, goggles, or other device be worn.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, there are many possible arrangements for projection optics and mirror surfaces that could be used with the monocentric arrangement of components disclosed for this invention.

Thus, what is provided is a monocentric optical apparatus for autostereoscopic display, providing a very wide field of view and large viewing pupils.

The invention has been described in detail with particular reference to certain preferred embodiments thereof, but it will be understood that variations and modifications can be effected within the scope of the invention.

Parts List

10 Autostereoscopic imaging system
12 Observer
14 Viewing pupil
14*l* Left viewing pupil
14*r* Right viewing pupil
16 Beamsplitter
18 Lens assembly
18*l* Left-eye lens assembly
18*r* Right-eye lens assembly
20 Optical system
20*l* Left optical system
20*r* Right optical system
22 Front focal surface
24 Curved mirror
26 Optical axis
26*l* Left optical axis
26*r* Right optical axis
28 Interocular distance
30 Ball lens assembly
30*l* Left ball lens assembly
30*r* Right ball lens assembly
31 Spherical gradient-index ball lens assembly
32 Diffusing element
32*l* Diffusing element
32*r* Diffusing element
34 Light source
36 Spatial light modulator
36*l* Spatial light modulator
36*r* Spatial light modulator
38 Polarizing beamsplitter
38*l* Polarizing beamsplitter
38*r* Polarizing beamsplitter
40 Curved diffusive surface
40*l* Left curved diffusive surface
40*r* Right curved diffusive surface
42 Meniscus lens
44 Meniscus lens
46 Central spherical lens
47 Spherical gradient-index ball lens
48 Exit pupil
49 Exit pupil
50 Dispersive point source
54 Relay lens assembly
54*l* Relay lens assembly
54*r* Relay lens assembly
56 Fiber optic faceplate
58 Input concave surface
60 Output concave surface
62 Seam
64 Segment
66 Fresnel mirror
68 Human eye pupil
68*l* Human eye pupil
68*r* Human eye pupil
70 Image generation system
70*l* Right image generation system
70*r* Left image generation system
72 Projection system
72*l* Left projection system
72*r* Right projection system
74 Image generator
76 Intermediate image
76*l* Left intermediate image 76r Right intermediate image
80 Curved image
80l Left curved image
80r Right curved image
82 Stereoscopic projection system
84 Flat image-forming emissive surface
86 Flat surface
88 Emissive image-forming surface
90 Cathode-ray tube
C Center of curvature
M Monocentric axis
$M^1$ Optical equivalent of monocentric axis M

What is claimed is:

1. A monocentric autostereoscopic optical apparatus for viewing a stereoscopic virtual image comprising a left image to be viewed by an observer at a left viewing pupil and a right image to be viewed by the observer at a right viewing pupil, the apparatus comprising:
   (a) a left optical system for forming said left image to be viewed at said left viewing pupil, the system comprising:
      (1) a left image generation system for providing scene content, comprising a left image generator and a left relay lens for forming a left intermediate image;
      (2) a left projection system comprising a left spherically curved diffusive surface for accepting said left intermediate image, said left spherically curved surface having a center of curvature substantially concentric with a left spherical gradient-index ball lens, said left spherical gradient-index ball lens spaced apart from said left spherically curved diffusive surface such that a left curved image is formed, said left curved image being a real image, a center of curvature of said left curved image coincident with a center of curvature of said left spherical gradient-index ball lens, said left spherical gradient-index ball lens having a left spherical gradient-index ball lens pupil;
   (b) a right optical system for forming said right image to be viewed at said right viewing pupil, the system comprising:
      (1) a right image generation system for providing scene content, comprising a right image generator and a right relay lens for forming a right intermediate image;
      (2) a right projection system comprising a right spherically curved diffusive surface for accepting said right intermediate image, said right spherically curved surface having a center of curvature substantially concentric with a right spherical gradient-index ball lens, said right spherical gradient-index ball lens spaced apart from said right spherically curved diffusive surface such that a right curved image is formed, said right curved image being a real image, a center of curvature of said right curved image coincident with a center of curvature of said right spherical gradient-index ball lens, said right spherical gradient-index ball lens having a right spherical gradient-index ball lens pupil;
   (c) a curved mirror, said curved mirror having a center of curvature placed optically midway between said left spherical gradient-index ball lens and said right spherical gradient-index ball lens; and
   (d) a beamsplitter disposed to reflect said left and right curved images toward said curved mirror, said curved mirror disposed to form a virtual stereoscopic image of said left and right curved images, and said curved mirror disposed to form, through said beamsplitter, a real image of said left spherical gradient-index ball lens pupil at said left viewing pupil and a real image of said right spherical gradient-index ball lens pupil at said right viewing pupil.

2. The optical apparatus of claim 1 wherein said left image generator comprises a liquid crystal device.

3. The optical apparatus of claim 1 wherein said left image generator comprises a digital micromirror device.

4. The optical apparatus of claim 1 wherein said left image generator comprises a laser.

5. The optical apparatus of claim 1 wherein said left image generator comprises a cathode-ray tube.

6. The optical apparatus of claim 1 wherein said left image generator comprises a grating light valve.

7. The optical apparatus of claim 1 wherein said right image generator comprises a liquid crystal device.

8. The optical apparatus of claim 1 wherein said right image generator comprises a digital micromirror device.

9. The optical apparatus of claim 1 wherein said right image generator comprises a laser.

10. The optical apparatus of claim 1 wherein said right image generator comprises a cathode-ray tube.

11. The optical apparatus of claim 1 wherein said right image generator comprises a grating light valve.

12. The optical apparatus of claim 1 wherein said left spherically curved diffusive surface comprises a coating.

13. The optical apparatus of claim 1 wherein a fiber optic faceplate comprises said left spherically curved diffusive surface.

14. The optical apparatus of claim 1 wherein said right spherically curved diffusive surface comprises a coating.

15. The optical apparatus of claim 1 wherein a fiber optic faceplate comprises said right spherically curved diffusive surface.

16. The optical apparatus of claim 1 wherein said curved mirror comprises a plurality of mirror segments.

17. The optical apparatus of claim 16 wherein said plurality of mirror segments comprises at least one spherical mirror.

18. The optical apparatus of claim 16 wherein said plurality of mirror segments comprises at least two replicated mirrors.

19. The optical apparatus of claim 1 wherein said curved mirror is essentially spherical.

20. The optical apparatus of claim 1 wherein said curved mirror comprises a stretched membrane.

21. The optical apparatus of claim 1 wherein said curved mirror comprises a Fresnel mirror.

22. The optical apparatus of claim 1 wherein respective optical axes for said left optical system and for said right optical system are disposed at a convergent angle.

23. The optical apparatus of claim 1 wherein said left ball lens comprises a central spherical lens.

24. The optical apparatus of claim 23 wherein said left spherical gradient-index ball lens further comprises at least one meniscus lens, wherein both surfaces of said meniscus lens share a common center of curvature with said central spherical lens.

25. The optical apparatus of claim 23 wherein said central spherical lens comprises a refractive liquid.

26. The optical apparatus of claim 1 wherein said right spherical gradient-index ball lens comprises a central spherical lens.

27. The optical apparatus of claim 26 wherein said right spherical gradient-index ball lens further comprises at least one meniscus lens, wherein both surfaces of said meniscus lens share a common center of curvature with said central spherical lens.

28. The optical apparatus of claim 26 wherein said central spherical lens comprises a refractive liquid.

29. The optical apparatus of claim 1 wherein said left spherical gradient-index ball lens is located between 55 mm to 75 mm from said right spherical gradient-index ball lens.

30. The optical apparatus of claim 1 wherein said curved mirror is cylindrical.

31. The optical apparatus of claim 1 wherein said curved mirror is toroidal.

32. A monocentric autostereoscopic optical apparatus for viewing a stereoscopic virtual image comprising a left image to be viewed by an observer at a left viewing pupil and a right image to be viewed by the observer at a right viewing pupil, the apparatus comprising:
 (a) a left optical system for forming said left image to be viewed at said left viewing pupil, the system comprising a left projection system comprising a left spherically curved image-forming surface for forming a left intermediate image, said left spherically curved image-forming surface having its center of curvature substantially concentric with a left spherical gradient-index ball lens, said left spherical gradient-index ball lens spaced apart from said left spherically curved image-forming surface such that a left curved image is formed, said left curved image being a real image, the center of curvature of said left curved image coincident with the center of curvature of said left spherical gradient-index ball lens, said left spherical gradient-index ball lens having a left spherical gradient-index ball lens pupil;
 (b) a right optical system for forming said right image to be viewed at said night viewing pupil, the system comprising a right projection system comprising a right spherically curved image-forming surface for forming a right intermediate image, said right spherically curved image-forming surface having its center of curvature substantially concentric with a right spherical gradient-index ball lens, said right spherical gradient-index ball lens spaced apart from said right spherically curved image-forming surface such that a right curved image is formed, said right curved image being a real image, the center of curvature of said right curved image coincident with the center of curvature of said right spherical gradient-index ball lens, said right spherical gradient-index ball lens having a right spherical gradient-index ball lens pupil;
 (c) a curved mirror, said curved mirror having its center of curvature placed substantially optically midway between said left spherical gradient-index ball lens and said right spherical gradient-index ball lens; and
 (d) a beamsplitter disposed to reflect said left and right curved images toward said curved mirror, said curved mirror disposed to form a virtual stereoscopic image of said left and right curved images, and said curved mirror disposed to form, through said beamsplitter, a real image of said left spherical gradient-index ball lens pupil at said left viewing pupil and a real image of said right spherical gradient-index ball lens pupil at said right viewing pupil.

33. The apparatus of claim 32 wherein said left spherically curved image-forming surface comprises an organic light emitting diode array.

34. The apparatus of claim 32 wherein said left spherically curved image-forming surface comprises a polymer light emitting diode array.

35. The apparatus of claim 32 wherein said right spherically curved image-forming surface comprises an organic light emitting diode array.

36. The apparatus of claim 32 wherein said right spherically curved image-forming surface comprises a polymer light emitting diode array.

37. The optical apparatus of claim 32 wherein said curved mirror comprises a plurality of mirror segments.

38. The optical apparatus of claim 37 wherein said plurality of mirror segments comprises at least one spherical mirror.

39. The optical apparatus of claim 37 wherein said plurality of mirror segments comprises at least two replicated mirrors.

40. The optical apparatus of claim 32 wherein said curved mirror is essentially spherical.

41. The optical apparatus of claim 32 wherein said curved mirror comprises a stretched membrane.

42. The optical apparatus of claim 32 wherein said curved mirror comprises a Fresnel mirror.

43. The optical apparatus of claim 32 wherein respective optical axes for said left optical system and for said right optical system are disposed at a convergent angle.

44. The optical apparatus of claim 32 wherein said left spherically curved image-forming surface comprises a cathode-ray tube.

45. The optical apparatus of claim 32 wherein said right spherically curved image-forming surface comprises a cathode-ray tube.

46. The optical apparatus of claim 32 wherein said left spherical gradient-index ball lens is located between 55 mm to 75 mm from said right spherical gradient-index ball lens.

47. A monocentric autostereoscopic optical apparatus for viewing a stereoscopic virtual image comprising a left image to be viewed by an observer at a left viewing pupil and a right image to be viewed by the observer at a right viewing pupil, the apparatus comprising:
 (a) a left optical system for forming said left image to be viewed at said left viewing pupil, the system comprising:
  (1) a left image generation system for providing scene content, comprising a left image generator and a left relay lens for forming a left intermediate image;
  (2) a left projection system comprising a left spherically curved diffusive surface for accepting said left intermediate image, said left spherically curved surface having its center of curvature substantially concentric with a left spherical gradient-index ball lens, said left spherical gradient-index ball lens spaced apart from said left spherically curved diffusive surface such that a left curved image is formed, said left curved image being a real image, the center of curvature of said left curved image coincident with the center of curvature of said left spherical gradient-index ball lens, said left spherical gradient-index ball lens having a left spherical gradient-index ball lens pupil;
 (b) a right optical system for forming said right image to be viewed at said right viewing pupil, the system comprising:
  (1) a right image generation system for providing scene content, comprising a right image generator and a right relay lens for forming a right intermediate image;
  (2) a right projection system comprising a right spherically curved diffusive surface for accepting said right intermediate image, said right spherically curved surface having its center of curvature substantially concentric with a right spherical gradient-index ball lens, said right spherical gradient-index ball lens spaced apart from said right spherically curved diffusive surface such that a right curved image is formed, said right curved image being a real image, the center of curvature of said right curved image coincident with the center of curvature of said right spherical gradient-index ball lens, said right spherical gradient-index ball lens having a right spherical gradient-index ball lens pupil;

(c) a curved mirror, said curved mirror located an equal distance from said left and right spherical gradient-index ball lens and said left and right viewing pupils, said curved mirror disposed to form a virtual stereoscopic image from said left and right curved images, and said curved mirror disposed to form a real image of said left spherical gradient-index ball lens pupil at said left viewing pupil and a real image of said right spherical gradient-index ball lens pupil at said right viewing pupil.

48. The optical apparatus of claim 47 wherein said left image generator comprises a liquid crystal device.

49. The optical apparatus of claim 47 wherein said left image generator comprises a digital micromirror device.

50. The optical apparatus of claim 47 wherein said left image generator comprises a laser.

51. The optical apparatus of claim 47 wherein said left image generator comprises a cathode-ray tube.

52. The optical apparatus of claim 47 wherein said left image generator comprises a grating light valve.

53. The optical apparatus of claim 47 wherein said right image generator comprises a liquid crystal device.

54. The optical apparatus of claim 47 wherein said right image generator comprises a digital micromirror device.

55. The optical apparatus of claim 47 wherein said right image generator comprises a laser.

56. The optical apparatus of claim 47 wherein said right image generator comprises a cathode-ray tube.

57. The optical apparatus of claim 47 wherein said right image generator comprises a grating light valve.

58. The optical apparatus of claim 47 wherein said left spherically curved diffusive surface comprises a coating.

59. The optical apparatus of claim 47 wherein a fiber optic faceplate comprises said left spherically curved diffusive surface.

60. The optical apparatus of claim 47 wherein said right spherically curved diffusive surface comprises a coating.

61. The optical apparatus of claim 47 wherein a fiber optic faceplate comprises said right spherically curved diffusive surface.

62. The optical apparatus of claim 47 wherein said curved mirror comprises a plurality of mirror segments.

63. The optical apparatus of claim 62 wherein said plurality of mirror segments comprises at least one spherical mirror.

64. The optical apparatus of claim 62 wherein said plurality of mirror segments comprises at least two replicated mirrors.

65. The optical apparatus of claim 47 wherein said curved mirror is essentially spherical.

66. The optical apparatus of claim 47 wherein said curved mirror comprises a stretched membrane.

67. The optical apparatus of claim 47 wherein said curved mirror comprises a Fresnel mirror.

68. The optical apparatus of claim 47 wherein respective optical axes for said left optical system and for said right optical system are disposed at a convergent angle.

69. The optical apparatus of claim 47 wherein said left spherical gradient-index ball lens comprises a central spherical lens.

70. The optical apparatus of claim 69 wherein said left spherical gradient-index ball lens further comprises at least one meniscus lens, wherein both surfaces of said meniscus lens share a common center of curvature with said central spherical lens.

71. The optical apparatus of claim 69 wherein said central spherical lens comprises a refractive liquid.

72. The optical apparatus of claim 47 wherein said right spherical gradient-index ball lens comprises a central spherical lens.

73. The optical apparatus of claim 72 wherein said right spherical gradient-index ball lens further comprises at least one meniscus lens, wherein both surfaces of said meniscus lens share a common center of curvature with said central spherical lens.

74. The optical apparatus of claim 47 wherein said left spherical gradient-index ball lens is located between 55 mm to 75 mm from said right spherical gradient-index ball lens.

75. The optical apparatus of claim 72 wherein said central spherical lens comprises a refractive liquid.

76. The optical apparatus of claim 47 wherein said curved mirror is cylindrical.

77. The optical apparatus of claim 47 wherein said curved mirror is toroidal.

78. The optical apparatus of claim 47 wherein said curved mirror is elliptical.

79. A monocentric autostereoscopic optical apparatus for viewing a stereoscopic virtual image comprising a left image to be viewed by an observer at a left viewing pupil and a right image to be viewed by the observer at a right viewing pupil, the apparatus comprising:

(a) a left optical system for forming said left image to be viewed at said left viewing pupil, the system comprising a left projection system comprising a left spherically curved image-forming surface for forming a left intermediate image, said left spherically curved image-forming surface having its center of curvature substantially concentric with a left spherical gradient-index ball lens, said left ball lens spaced apart from said left spherically curved image-forming surface such that a left curved image is formed, said left curved image being a real image, the center of curvature of said left curved image coincident with the center of curvature of said left spherical gradient-index ball lens, said left spherical gradient-index ball lens having a left spherical gradient-index ball lens pupil;

(b) a right optical system for forming said right image to be viewed at said right viewing pupil, the system comprising a right projection system comprising a right spherically curved image-forming surface for forming a right intermediate image, said right spherically curved image-forming surface having its center of curvature substantially concentric with a right spherical gradient-index ball lens, said right ball lens spaced apart from said right spherically curved image-forming surface such that a right curved image is formed, said right curved image being a real image, the center of curvature of said right curved image coincident with the center of curvature of said right spherical gradient-index ball lens, said right spherical gradient-index ball lens having a right spherical gradient-index ball lens pupil; and (c) a curved mirror, said curved mirror located an equal distance from said left and right spherical gradient-index ball lens and said left and right viewing pupils, said curved mirror disposed to form a virtual stereoscopic image from said left and right curved images and said curved mirror disposed to form a real image of said left spherical gradient-index ball lens pupil at said left viewing pupil and a real image of said right spherical gradient-index ball lens pupil at said right viewing pupil.

80. The apparatus of claim 79 wherein said left spherically curved image-forming surface comprises an organic light emitting diode array.

81. The apparatus of claim 79 wherein said left spherically curved image-forming surface comprises a polymer light emitting diode array.

82. The apparatus of claim 79 wherein said right spherically curved image-forming surface comprises an organic light emitting diode array.

83. The apparatus of claim 79 wherein said right spherically curved image-forming surface comprises a polymer light emitting diode array.

84. The optical apparatus of claim 79 wherein said curved mirror comprises a plurality of mirror segments.

85. The optical apparatus of claim 84 wherein said plurality of mirror segments comprises at least one spherical mirror.

86. The optical apparatus of claim 79 wherein said curved mirror is toroidal.

87. The optical apparatus of claim 79 wherein said curved mirror is elliptical.

88. The optical apparatus of claim 84 wherein said plurality of mirror segments comprises at least two replicated mirrors.

89. The optical apparatus of claim 79 wherein said curved mirror is essentially spherical.

90. The optical apparatus of claim 79 wherein said curved mirror comprises a stretched membrane.

91. The optical apparatus of claim 79 wherein said curved mirror comprises a Fresnel mirror.

92. The optical apparatus of claim 79 wherein respective optical axes for said left optical system and for said right optical system are disposed at a convergent angle.

93. The optical apparatus of claim 79 wherein said left spherically curved image-forming surface comprises a cathode-ray tube.

94. The optical apparatus of claim 79 wherein said right spherically curved image-forming surface comprises a cathode-ray tube.

95. The optical apparatus of claim 79 wherein said left spherical gradient-index ball lens is located between 55 mm to 75 mm from said right spherical gradient-index ball lens.

96. A method for display of a stereoscopic virtual image to an observer, the image comprising a left image to be viewed by the observer at a left viewing pupil and a right image to be viewed by the observer at a right viewing pupil, the method comprising the steps of:

(a) forming a left intermediate image on a left spherically curved diffusive surface, said left spherically curved diffusive surface having a center of curvature coincident with a left spherical gradient-index ball lens, said left spherical gradient-index ball lens having a left spherical gradient-index ball lens pupil;

(b) projecting said left intermediate image by said left spherical gradient-index ball lens to form a left curved image near the front focal surface of a curved mirror;

(c) forming a left virtual image from said left curved image, said left virtual image viewable from said left viewing pupil, said left viewing pupil formed by said curved mirror as an image of said left spherical gradient-index ball lens pupil;

(d) forming a right intermediate image on a right spherically curved diffusive surface, said right spherically curved diffusive surface having a center of curvature coincident with a right spherical gradient-index ball lens, said right spherical gradient-index ball lens having a right spherical gradient-index ball lens pupil;

(e) projecting said right intermediate image by said right spherical gradient-index ball lens to form a right curved image near the front focal surface of said curved mirror; and (f) forming a right virtual image from said right curved image, said right virtual image viewable from said right viewing pupil, said right pupil formed by said curved mirror as an image of said right spherical gradient-index ball lens pupil.

97. The method of claim 96 wherein the step of forming said left intermediate image on a left spherically curved diffusive surface further comprises the steps of:

(a) modulating a light source using a spatial light modulator to form a source image comprising an array of pixels; and (b) relaying said source image from said spatial light modulator onto said left spherically curved diffusive surface.

98. The method of claim 96 wherein the step of forming said right intermediate image on a right spherically curved diffusive surface further comprises the steps of:

(a) modulating a light source using a spatial light modulator to form a source image comprising an array of pixels; and (b) relaying said source image from said spatial light modulator onto said right spherically curved diffusive surface.

99. The method of claim 96 wherein the step of forming said left intermediate image on said left spherically curved diffusive surface comprises the step of forming an image on an organic LED array surface.

100. The method of claim 96 wherein the step of forming said left intermediate image on said left spherically curved diffusive surface comprises the step of forming an image on a polymer LED array surface.

101. The method of claim 96 wherein the step of projecting said left intermediate image to form said left curved image further comprises the intermediate step of projecting said left intermediate image through a beamsplitter.

102. The method of claim 96 wherein the step of forming said right intermediate image on said right spherically curved diffusive surface comprises the step of forming an image on an organic LED array surface.

103. The method of claim 96 wherein the step of forming said right intermediate image on said right spherically curved diffusive surface comprises the step of forming an image on a polymer LED array surface.

104. The method of claim 96 wherein the step of projecting said right intermediate image to form said right curved image further comprises the intermediate step of projecting said right intermediate image through a beamsplitter.

105. The optical apparatus of claim 96 wherein said left spherical gradient-index ball lens is located between 55 mm to 70 mm from said right spherical gradient-index ball lens.

* * * * *